United States Patent
Choi et al.

(10) Patent No.: US 11,934,850 B2
(45) Date of Patent: Mar. 19, 2024

(54) ELECTRONIC DEVICE FOR DISPLAYING EXECUTION SCREEN OF APPLICATION, OPERATING METHOD THEREOF, AND STORAGE MEDIUM

(71) Applicant: Samsung Electronics Co., Ltd., Gyeonggi-do (KR)

(72) Inventors: Yuri Choi, Gyeonggi-do (KR); Changhwan Kim, Gyeonggi-do (KR); Sungchan Bae, Gyeonggi-do (KR); Jieun Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/881,228

(22) Filed: Aug. 4, 2022

(65) Prior Publication Data

US 2023/0038036 A1 Feb. 9, 2023

Related U.S. Application Data

(63) Continuation of application No. PCT/KR2022/010466, filed on Jul. 18, 2022.

(30) Foreign Application Priority Data

Aug. 6, 2021 (KR) ........................ 10-2021-0104184

(51) Int. Cl.
*G06F 3/04883* (2022.01)
*G06F 3/04845* (2022.01)
(Continued)

(52) U.S. Cl.
CPC .......... *G06F 9/452* (2018.02); *G06F 3/04845* (2013.01); *G06F 3/0486* (2013.01); *G06F 3/04883* (2013.01); *G06F 3/0414* (2013.01)

(58) Field of Classification Search
CPC ...... G06F 3/041–047; G06F 2203/041–04114; G06F 9/451;
(Continued)

(56) References Cited

U.S. PATENT DOCUMENTS

2008/0172617 A1  7/2008 Takeda et al.
2015/0089443 A1  3/2015 Lee et al.
(Continued)

FOREIGN PATENT DOCUMENTS

CN  105988662  10/2016
CN  103164269  5/2017
(Continued)

*Primary Examiner* — Sanjiv D. Patel
(74) *Attorney, Agent, or Firm* — The Farrell Law Firm, P.C.

(57) ABSTRACT

An electronic device is disclosed and includes a display and at least one processor operatively connected with the display. The at least one processor is configured to, when an application is executed, display an execution window corresponding to the application on the display, display the execution window, as a first shape of execution window, on at least a portion of the display, in response to a background switch request for the application, identify a state of the application while displaying the first shape of execution window, and switch the first shape of execution window into a second shape of execution window according to the state of the application.

18 Claims, 19 Drawing Sheets

(51) Int. Cl.
 *G06F 3/0486* (2013.01)
 *G06F 9/451* (2018.01)
 *G06F 3/041* (2006.01)

(58) Field of Classification Search
 CPC .. G06F 3/0481; G06F 3/0482; G06F 3/04886; G06F 3/04883; G06F 2203/04803; G06F 3/04842; G06F 3/04845
 See application file for complete search history.

(56) References Cited

U.S. PATENT DOCUMENTS

| | | |
|---|---|---|
| 2016/0154536 A1 | 6/2016 | Kim et al. |
| 2016/0309307 A1* | 10/2016 | Agarwal ................. G08B 7/06 |
| 2017/0245017 A1 | 8/2017 | Chaudhri |
| 2021/0064191 A1 | 3/2021 | Liao et al. |

FOREIGN PATENT DOCUMENTS

| | | | |
|---|---|---|---|
| JP | 2011-181007 | 9/2011 | |
| JP | 5-172156 | 1/2013 | |
| KR | 20050100253 A * | 10/2005 | |
| KR | 1020050100253 | 10/2005 | |
| KR | 10-2015-0015655 | 2/2015 | |
| KR | 10-2015-0032965 | 4/2015 | |
| KR | 10-1745002 | 6/2017 | |
| KR | 10-2117048 | 5/2020 | |
| KR | 20200113834 A * | 10/2020 | ............. G06F 9/451 |
| KR | 1020200113834 | 10/2020 | |
| KR | 10-2021-0028046 | 3/2021 | |
| WO | WO-2009081477 A1 * | 7/2009 | ........... G06F 3/0481 |

\* cited by examiner (a)

(b)

(c)

(d)

ELECTRONIC DEVICE FOR DISPLAYING EXECUTION SCREEN OF APPLICATION, OPERATING METHOD THEREOF, AND STORAGE MEDIUM

CROSS-REFERENCE TO RELATED APPLICATION(S)

This application is a bypass continuation application of International Application No. PCT/KR2022/010466, which was filed on Jul. 18, 2022, and is based on and claims priority under 35 U.S.C. § 119 to Korean Patent Application No. 10-2021-0104184, which was filed in the Korean Intellectual Property Office on Aug. 6, 2021, the entire disclosure of each of which is incorporated herein by reference.

BACKGROUND

1. Field

Various embodiments of the disclosure relate to an electronic device for displaying an execution screen of an application, an operating method thereof, and a storage medium.

2. Description of Related Art

An electronic device may store various types of applications, execute an application for providing a specific service, and display graphic elements interactable with the user on the execution screen of the executed application.

As one electronic device is equipped with various applications, the electronic device may provide, e.g., multitasking capable of simultaneously using two or more applications. The electronic device may display the execution screens of the applications in two or more windows without inconvenience to the user's use of multitasking.

While the execution screen of an application to be used by the user is displayed by the electronic device, an application previously used may be displayed on a partial screen or subjected to a background state according to the user's control. For example, the user may simultaneously use a plurality of applications and execute another application without intent to terminate the application being used. However, when the user executes another application, it may be difficult to find a settings menu for setting whether the user continues to display the execution screen of the application being currently displayed.

For example, when executing a video playback application while displaying the execution screen of a timer application, the electronic device has no other choice but to enter the timer application or check the status bar (e.g., ongoing notification) to see the actual timer operation state although the timer function is running in the background. Further, if the user executes an application with another application running, it may be common that the execution screen of the application is overlaid and displayed in a specific position to cover the execution screen of another application being currently displayed. As such, there may be needed a method for displaying an execution screen of an application, which allows the user to effectively check, at a glance, the application being currently used and the application running in the background even without executing the previously used application back in the foreground.

SUMMARY

According to various embodiments of the disclosure, an electronic device is provided for displaying an execution screen of an application to effectively display an execution screen for an application running in the background, a method for operating the same, and a storage medium.

According to an embodiment, an electronic device includes a display and at least one processor operatively connected with the display. The at least one processor may be configured to, based on an application being executed, display an execution window corresponding to the application on the display, display the execution window, as a first shape of execution window, on at least a portion of the display, in response to a background switch request for the application, identify a state of the application while displaying the first shape of execution window, and switch the first shape of execution window into a second shape of execution window according to the state of the application.

According to an embodiment, a method for displaying an execution screen of an application by an electronic device includes displaying an execution window corresponding to the application on a display based on the application being executed, displaying the execution window, as a first shape of execution window, on at least a portion of the display, in response to a background switch request for the application, identifying a state of the application while displaying the first shape of execution window, and switching the first shape of execution window into a second shape of execution window according to the state of the application.

According to an embodiment, a non-transitory computer readable storage medium is provided which stores instructions configured to, when executed by at least one processor of an electronic device, enable the electronic device to perform at least one operation. The at least one operation includes displaying an execution window corresponding to an application on a display of the electronic device based on the application being executed, displaying the execution window, as a first shape of execution window, on at least a portion of the display, in response to a background switch request for the application, identifying a state of the application while displaying the first shape of execution window, and switching the first shape of execution window into a second shape of execution window according to the state of the application.

BRIEF DESCRIPTION OF THE DRAWINGS

The above and other aspects, features, and advantages of certain embodiments of the present disclosure will be more apparent from the following detailed description taken in conjunction with the accompanying drawings, in which.

The same or similar reference denotations may be used to refer to the same or similar elements throughout the specification and the drawings.

DETAILED DESCRIPTION

Figure 1:
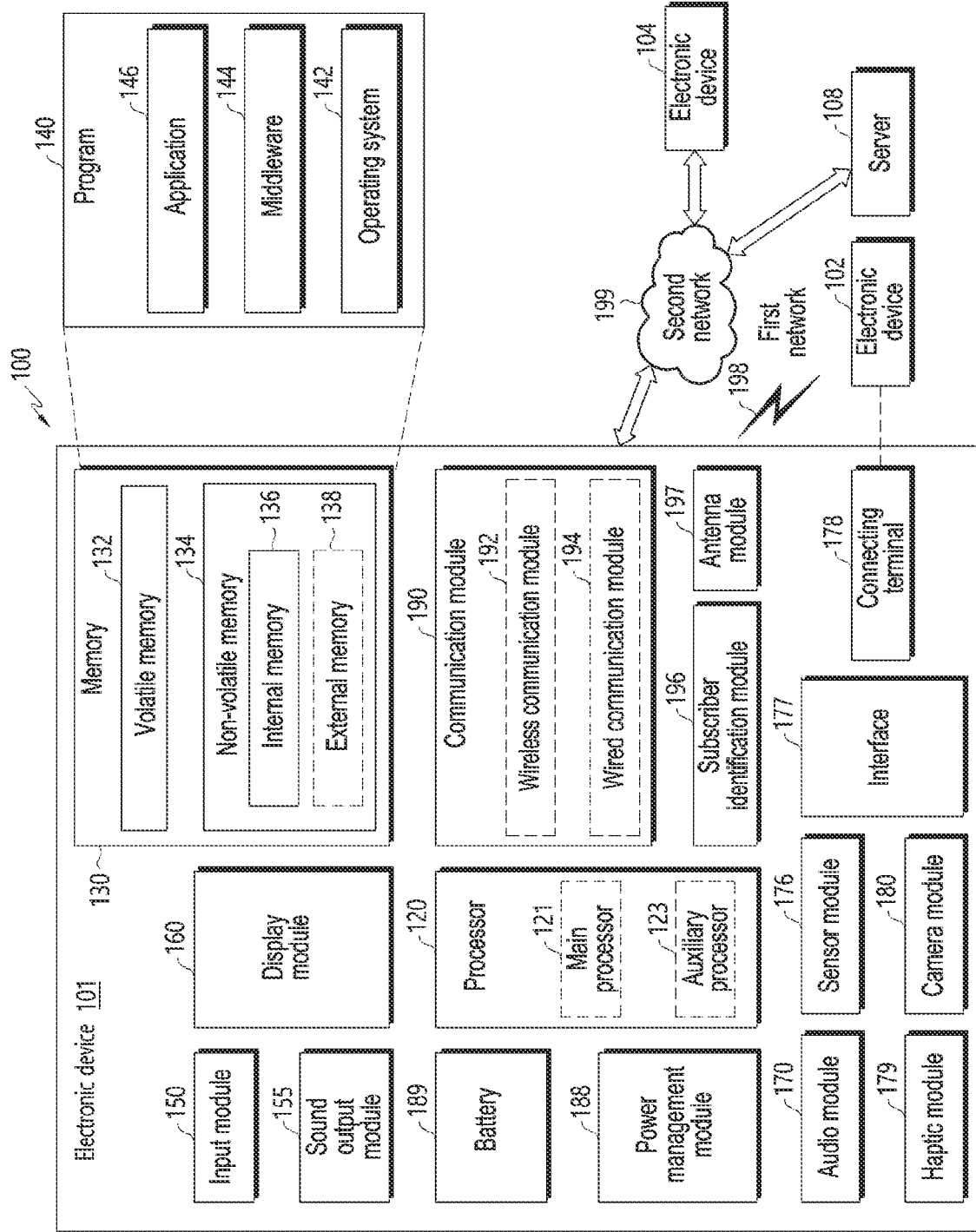
FIG. 1 is a view illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computations. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
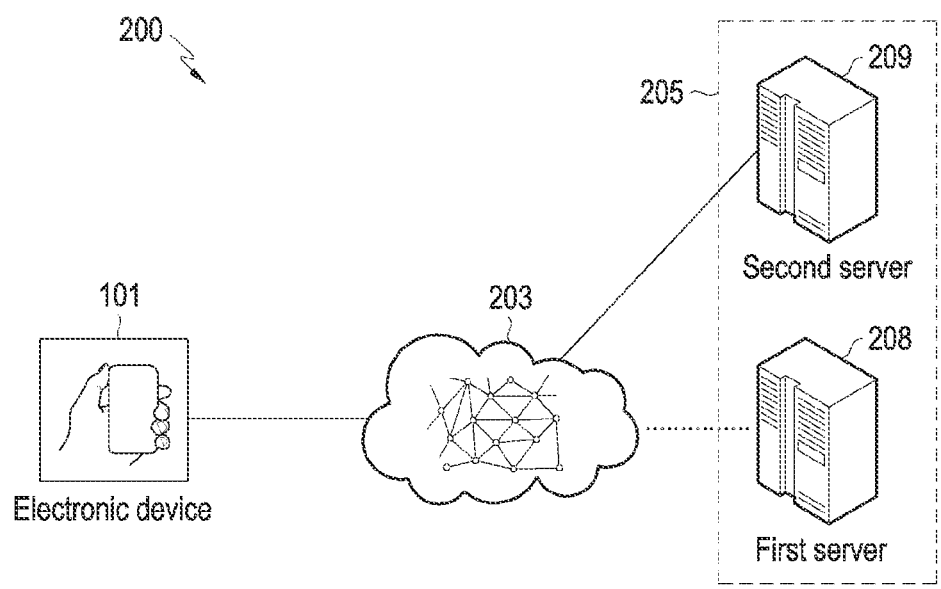
FIG. 2 is a conceptual diagram of a system for providing a content playback application according to an embodiment.

FIG. 2 is a conceptual diagram of a system for providing a content playback application according to an embodiment.

Referring to FIG. 2, a system 200 for providing a content playback application may include an electronic device 101 and at least one server 205 (e.g., the first server 208 or the second server 209).

The electronic device 101 may execute an application capable of playing content, and it may provide the user with the content played by the application visually or audibly. The application capable of playing content may be an application program that controls the electronic device 101 to play media content, such as video, music, and radio. The electronic device 101 may play corresponding content by the content playback application and provide it to the user. The content may include, e.g., web content provided through the Internet and multimedia content provided through a broadcasting network. The electronic device 101 may download or receive, by streaming, content from at least one server 205 (e.g., a content provider) through the network 203. For example, the electronic device 101 may receive web content from the first server 208 and it may receive multimedia content from the second server 209. The categories, types, or attributes of content provided by the plurality of servers may be different from each other.

The network 203 may be a data communication network, e.g., a private network or public network. For example, examples of the network 203 may include at least one of a private area network which covers a home, a local area network which covers a building, and a wide area network which covers a large city, a district, or a country border, or the Internet.

The at least one server 205 is a server that provides content that the user of the electronic device 101 wants to receive and may be connected to the electronic device 101 through a content playback application, and it may provide various application services to the electronic device 101. The at least one server 205 may store a plurality of contents that may be provided to the electronic device 101, and it may provide content to the electronic device 101 according to a request of the electronic device 101.

For example, the first server 208 and the second server 209 included in the at least one server 205 may stream or transmit content in real time through the content playback application, so that the electronic device 101 may download the corresponding content. The service provided by the at least one server 205 may include services in various fields, such as a content service. For example, the content service may refer to a service that provides images, videos, or music included in multimedia content, but the service type is not limited thereto. The first server 208 and the second server 209 each may correspond to at least one of a web content providing server, a broadcasting server, an over the top (OTT) server, a cloud server, or a streaming server.

Figure 3:
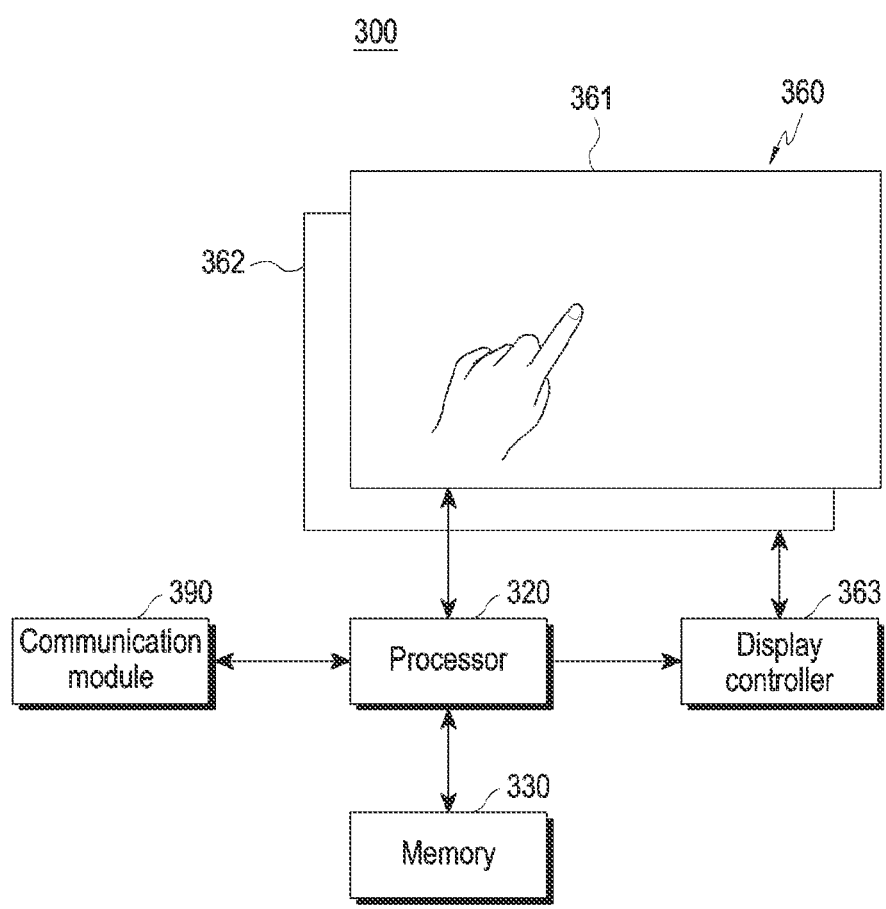
FIG. 3 is a block diagram illustrating an internal configuration of an electronic device according to an embodiment.

FIG. 3 is a block diagram illustrating an internal configuration of an electronic device according to an embodiment.

Not all of the components of FIG. 3 are essential ones of the electronic device 300 but the electronic device 300 may be implemented with more or less than the components of FIG. 3.

Referring to FIG. 3, a display 360 for detecting an input by a stylus pen or an input by the user's body (e.g., a finger) may be provided to the electronic device 300.

The display 360 may simultaneously support input/output functions of data and may detect touches. The display 360 may include a sensing panel 361, a display panel 362, and/or the display controller 363. The display 360 may be referred to as a touchscreen. The sensing panel may detect contact or proximity of a finger or an input device (e.g., a stylus pen). For example, the sensing panel may detect a hovering input by the input device, and it may transfer an input signal corresponding to the hovering input to the processor 320. Further, the sensing panel may detect the position of a touch input by a finger or an input device, and the display panel may output an image. The display controller may be a driving circuit that controls the display panel to output an image through the display panel.

When implemented in the form of a touchscreen, the display 360 may display various pieces of information generated according to the user's touch.

The memory 330 may be electrically connected to the processor 320 and store at least one application. The memory 330 may store a control program for controlling the electronic device 300, a user interface (UI) related to an application downloaded from the outside or provided by the manufacturer and images for providing the UI, user information, documents, databases, or related data.

The memory 330 may store the user settings for at least one application related to display of an application executed in the background.

The memory 330 may store at least one application executable in the background, and it may store user settings related to reservation (or alarm) for content for each application. For example, for a content-related application, the user may reserve or subscribe to a desired webpage, channel, and/or broadcast program, and the user may identify the content for the application by a picture-in-picture (PIP) type preview even without executing an application when the reserved time (or alarm time) arrives and execute the application according to a user input.

For example, a reservable application content may be content received from at least one server 205. For example, the content may be content received from at least one of a web content providing server, a broadcasting server, an OTT server, a cloud server, or a streaming server. Further, the content may include various contents, such as music streaming content and IoT real-time CCTV content, but may not be limited thereto.

The communication module 390 may form a communication channel with at least one server 205 and support data transmission/reception for content use. For example, the communication module 390 may receive application-related content from the server 205 when connecting to the server 205.

The processor 320 may execute at least one application in response to a user input. The processor 320 may display an execution screen (or window) of the application to occupy the entire display 360. In this case, the state information about the application on which the execution screen is displayed may be determined as foreground. The foreground may be a state in which the execution screen of the application currently running on the electronic device 300 is being displayed on the display 360, and the user may see the execution screen, and a specific button displayed on the execution screen is controllable. The foreground may be a state of the application in which an execution screen, such as a UI, is shown on the display 360. In contrast, the background may be a state in which an application is currently running on the electronic device 300, but its execution screen is not shown on the display.

The processor 320 may change the application in the foreground state into the background state when the user inputs user manipulation for using another application or by a user input for switching the screen into the home screen of the electronic device 300. For example, the user input for switching to the home screen may include input of a key, such as a home key or a back key.

In a case where there is no other running application than the application in the foreground state, the processor 320 may overlay and display the execution window of the application requested to be changed into the background state, on the home screen, in a designated display scheme. In contrast, in a case where there is another running application, the processor 320 may display the execution window of the application to partially overlap the execution screen of the other application.

In response to the change into the background state, the processor 320 may determine the size or position of the execution screen (or execution window) of the application to be overlaid and displayed in at least a portion of the display, rather than hiding the execution screen of the application in the foreground state and perform control on the execution window. The processor 320 may display the execution window of the application switched into the background state, using a designated shape of execution window. The designated shape of the execution window may be smaller than the execution window of the application displayed before switched into the background and be displayed in the form of a popup and movable. For example, the designated shape of execution window may include a PIP or a popup window. Here, the application switched into the background state may be switched into the background state, with it running or stopped from running.

Upon switching into the background state, the processor 320 may display the execution screen (or execution window) of the application using various shapes of execution windows depending on the execution state (or operation state) of the application. The processor 320 may change at least one of the size, shape, or position of the popup-type execution window of the application execution screen and display it in at least a portion of the display 360 depending on the execution state of the application. Here, the shape of the popup-type execution window may mean a shape, e.g., rectangle or square, but may be one including a size. The processor 320 may change at least one of the color effect, color, or saturation of the execution window, as well as the size, shape, or position of the popup-type execution window. For example, the processor 320 may make a change to the execution state of the application by changing the color or saturation output in the execution window (e.g., background) or the size of the graphic element filling (or occupying) the execution window based on the progress or a predetermined time elapse of the application running in the background state.

The application currently in the foreground state may be switched into the background state for use of another application. If it is switched into the background state while being used in the foreground state, it may be output in the form of a partial screen included as part in the entire screen by reflecting the user's intent to continue to use. For example, the execution window may be output in the form of a popup window or floating on the entire screen, and an example of such output scheme is a PIP scheme. The display of the execution window of the application running in the background state may be implemented to cover at least part, rather than the entire screen of the display. Such type of execution window may be referred to as a popup window, PIP, view, or widget, but is not limited thereto.

In response to a background switching request for the application, the processor 320 may display the execution screen of the application in a first shape of execution window. In particular, depending on the execution state (e.g., in use, in play, or pause) of the application, the processor 320 may switch the first shape of execution window into a second shape of execution window or display either the first shape of execution window or the second shape of execution window. The background switch may be performed by home key entry, back key entry, or execution of another application.

The processor 320 may display the first shape of execution window when a preset state or a designated condition is met, rather than displaying the first shape of execution window immediately when the application is switched into the background. For example, the processor 320 may display a designated shape of alarm execution window when a preset alarm time is imminent or arrives, rather than immediately displaying the designated shape of alarm execution window when the alarm application is switched into the background.

The execution screen of the application switched into the background state while being used may provide at least some of the content, information, or functions (or objects, menu, or icons), such as start, pause, resume, and end, for controlling the application, provided by the application when displayed using the first shape of execution window.

In contrast, when switched into the background state in the pause state, as compared with when switched into the background state in the in-use state, a second shape of execution window may be output which has only minimum content or functions. The second shape of execution window may be smaller in size than the first shape of execution window or may include fewer components (e.g., icons, objects, or menu) than the first shape of execution window. For example, the execution screen of the application switched into the background state in the pause state may provide minimum content related to execution of the application or minimum control functions, e.g., start, stop, resume, or such functional items, when displayed in the second shape of execution window. Such a way renders it possible to increase accessibility to the application running in the background state or visibility in display.

The processor 320 may change the first shape of execution window into the second shape of execution window, which differs from the first shape, according to an elapse of a designated wait time or a user input (e.g., a touch input to the first shape of execution window) while displaying the first shape of execution window.

The processor 320 may switch the first shape of execution window into the second shape of execution window when a designated wait time elapses and output the execution screen of the application in the switched second shape of execution window. The processor 320 may switch into the second shape of execution window immediately upon receiving a user input to the first shape of execution window without waiting for the designated wait time.

Here, the processor 320 may switch into the second shape of execution window by changing the size and/or placement position of the first shape of execution window, and the size of the second shape of execution window may be smaller than the size of the first shape of execution window.

For example, if no user input is made until the predetermined wait time elapses, it may be regarded as there being no user intent to actively use the application running in the background state. Accordingly, the processor 320 may display the second shape of execution window only including minimum content or minimum functions. At this time, if at least one other application is running in the foreground, the processor 320 may resize and/or reposition the first shape of execution window not to overlap the respective execution screens of the at least one other application, thereby switching into the second shape of execution window.

Meanwhile, if there is a user input while the first shape of execution window is displayed, the processor 320 may identify, e.g., a user input (e.g., touch input) to the execution window and pause or resume the application running in the background state according to the user input. The processor 320 may pause or resume the playback of the content (e.g., video, music, alarm, or timer) being played (or running) on the application according to the user input. For example, in response to the user input (e.g., touch input) to a component (e.g., a functional item related to control of the application) included in the execution window, the processor 320 may pause the running content or pause and then resume the content. For example, if the application is paused but running in the background, the processor 320 may release the pause and resume the operation by one touch input (e.g., toggling) and, if the application is running in the background while being used, it may be paused in response to the touch input. The execution state of the application may be represented as a graphic element or object in the first shape of execution window.

Applications which may be displayed in different shapes of execution windows depending on application execution states may include a clock application (or timer application), an alarm application, a video playback application, and a music playback application, but the type thereof is not limited thereto, but rather may be any application which may be operated in the background state in response to a background switch request. A method for displaying a specific shape of execution window depending on the type of the application is described below with reference to FIGS. 5 and 6.

An electronic device 300 may comprise a display 360 and at least one processor 320 operatively connected with the display. The at least one processor 320 may be configured to, based on an application being executed, display an execution window corresponding to the application on the display 360, display the execution window, as a first shape of execution window, on at least a portion of the display, in response to a background switch request for the application, identify a state of the application while displaying the first shape of execution window, and switch the first shape of execution window into a second shape of execution window according to the state of the application.

The first shape of execution window may be smaller than the execution screen (or execution window) of the application displayed before switched into the background and may be displayed and moved in the form of a popup. For example, the first shape of execution window may include, e.g., a PIP or a popup window.

The at least one processor may be configured to identify whether a designated wait time elapses while the application is running in the background and, in response to the elapse of the designated wait time, switch the first shape of execution window into a second shape of execution window.

The at least one processor may switch into the second shape of execution window by changing at least one of a size and placement position of the first shape of execution window. A size of the second shape of execution window may be smaller than the size of the first shape of execution window. The at least one processor may be configured to, based on at least one other application running in a foreground, switch into the second shape of execution window by changing at least one of the size and placement position of the first shape of execution window not to overlap an execution window corresponding to each of the at least one other application.

The at least one processor may be configured to identify a user input to the first shape of execution window while displaying the first shape of execution window and pause or resume the application in response to the user input.

The at least one processor may be configured to switch the first shape of execution window into the second shape of execution window in response to an additional user input to the first shape of execution window or an elapse of a designated wait time after pausing the application.

The at least one processor may be configured to, when the application is a timer application, drive a timer function of the timer application with a set timer time, identify a remaining time of the timer function while displaying the first shape of execution window including a progress of the timer function and switch the first shape of execution window into the second shape of execution window in response to the identified remaining time.

The at least one processor may be configured to change at least one of a color effect, color, or saturation of the second shape of execution window in association with the remaining time of the timer function.

The at least one processor may be configured to, in response to the set timer time being elapsed, display the second shape of execution window including an excess time of the timer function.

The at least one processor may be configured to identify a user input to the first shape of execution window while displaying the first shape of execution window including the progress of the timer function and, when the user input is a touch and drag input, move and display the first shape of execution window in a direction corresponding to the touch and drag input.

The at least one processor may be configured to, when the first shape of execution window at least partially departs from the display in response to the touch and drag input, switch the first shape of execution window into the second shape of execution window in response to the identified remaining time.

Figure 4:
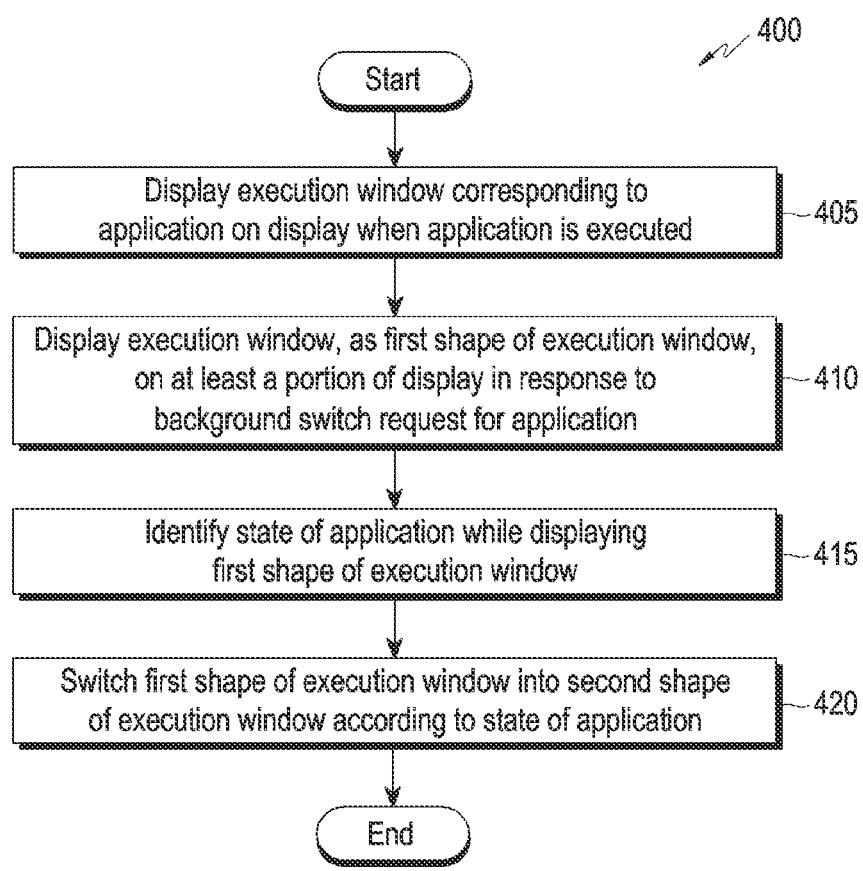
FIG. 4 is a flowchart illustrating operations of an electronic device to display an execution screen of an application according to an embodiment.

FIG. 4 is a flowchart 400 illustrating operations of an electronic device to display an execution screen of an application according to an embodiment.

Figure 5:
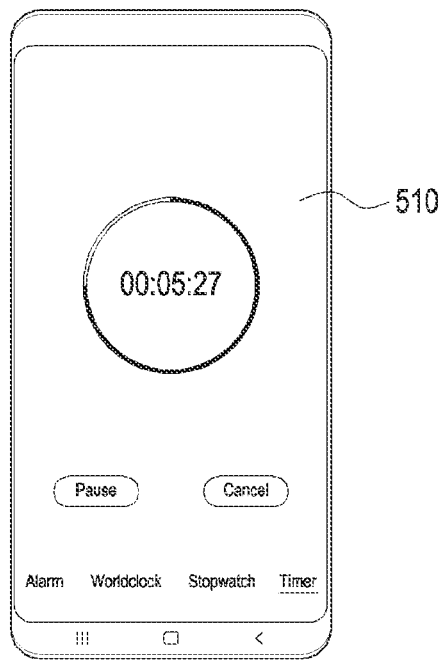
FIG. 5 illustrates a change in display scheme of a timer application when shifted to the background according to embodiment.
Figure 5:
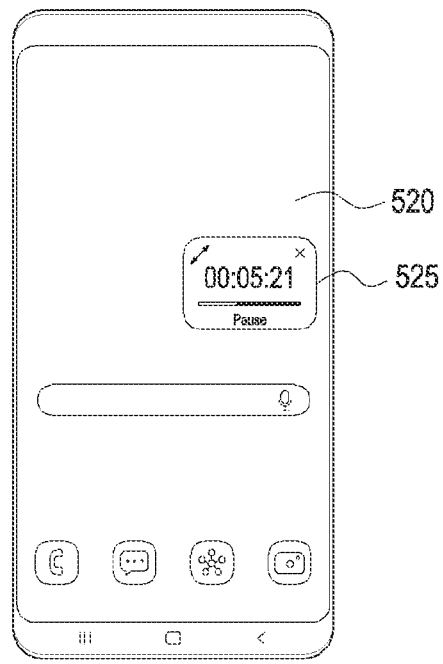
Figure 5:
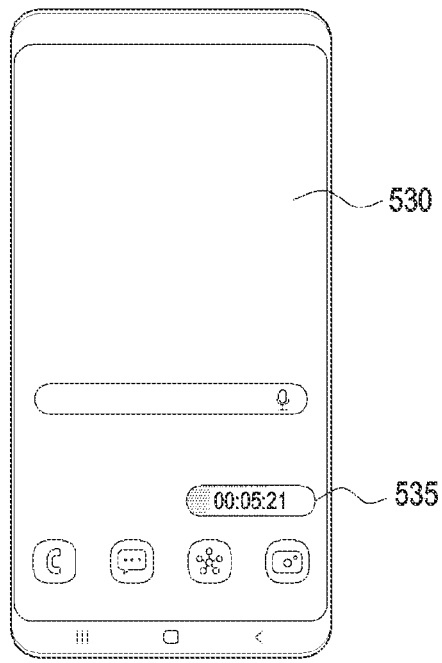
Figure 5:
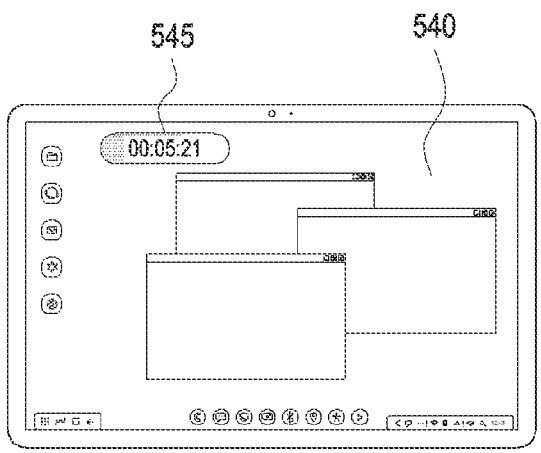
Figure 6:
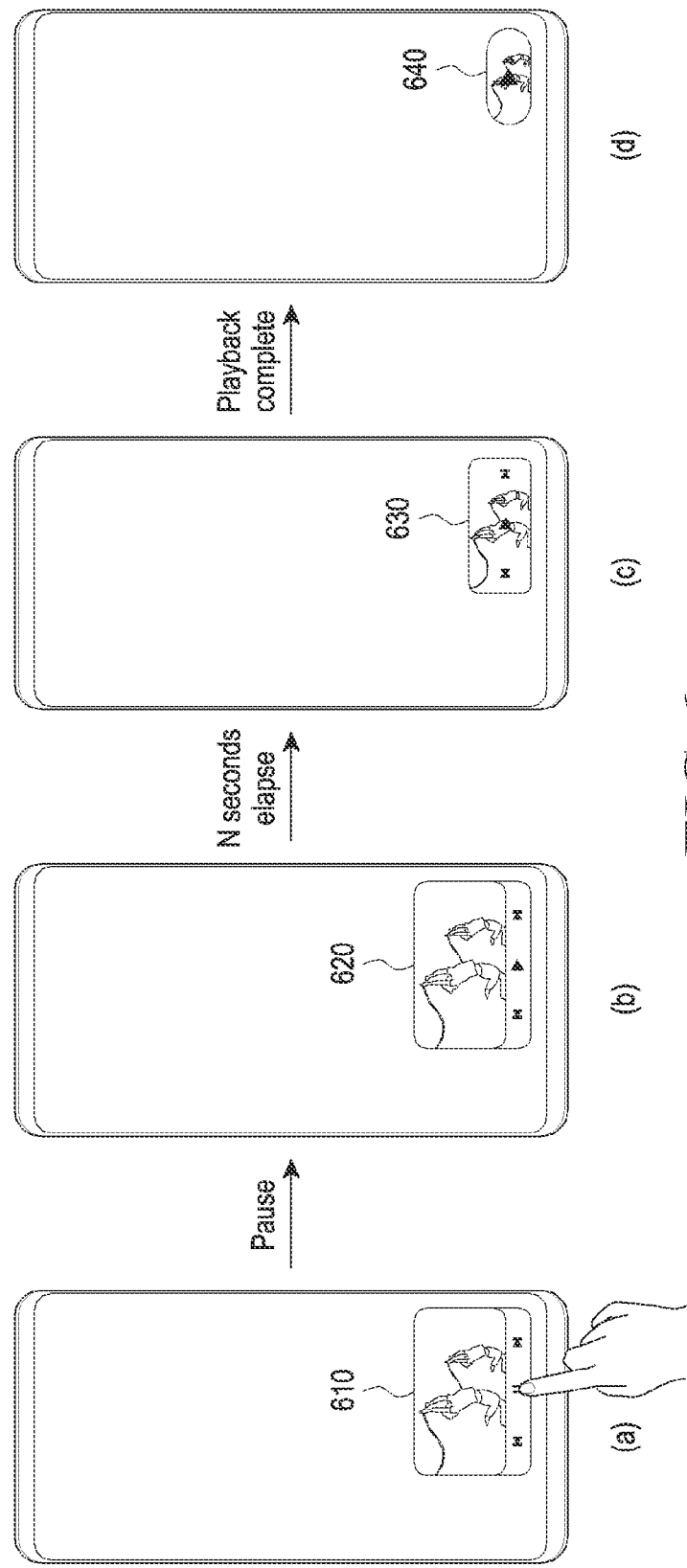
FIG. 6 illustrates a change in display scheme of a video playback application when shifted to the background according to an embodiment.

Each step/operation of the operation method for FIG. 4 may be performed by an electronic device (e.g., the electronic device 101 of FIG. 1 or the electronic device 300 of FIG. 3). The operations of the electronic device 300 are described in detail with reference to FIGS. 5 and 6. FIG. 5 illustrates a change in display scheme of a timer application when shifted to the background according to an embodiment. FIG. 6 illustrates a change in display scheme of a video playback application when shifted to the background according to an embodiment.

Referring to FIG. 4, in operation 405, when an application is executed, the electronic device 300 may display an execution window corresponding to the application on the display 360. In operation 410, in response to a background switch request for the application, the electronic device 300 may display the execution window, as the first shape of execution window, on at least a portion of the display. The first shape of execution window may include a picture-in-picture (PIP) or a popup window.

The electronic device 300 may identify whether a designated wait time elapses while the application is running in the background and, in response to the elapse of the designated wait time, switch the first shape of execution window into a second shape of execution window. Upon receiving a user input (e.g., touch input) to the first shape of execution window, the electronic device 300 may switch into the second shape of execution window immediately without waiting the wait time. The immediate switch of the first shape of execution window into another shape, e.g., the second shape of execution window or a third shape of execution window, may be triggered by a predetermined input type, e.g., a double tap, touch contact time (such as a long press), double finger pressure, or a designated specific key. In operation 415, the electronic device 300 may identify the state of the application while displaying the first shape of execution window. In operation 420, the electronic device 300 may switch the first shape of execution window into the second shape of execution window according to the state of the application. The state of the application may include an operation state, such as the in-use (or in-play), pause, or progress of the application.

The content of the application and the functional items related to control of the application may be included in the first shape of execution window, and minimum content or minimum functional items relation to the application may be included in the second shape of execution window.

The electronic device 300 may change at least one of the shape, size, or placement position of the execution window according to the time or user input, as well as the state of the application.

For example, the electronic device 300 may identify display data (e.g., information or control buttons) related to the application according to the state of the application and determine at least one of the execution window shape, size, or placement position including the identified display data. Here, the display data may include at least one of content related to the application running in the background, information, or functions (or objects, menu, or icons) such as start, pause, resume, and end for control of the application. Further, the electronic device 300 may continuously grasp the state of the application even while displaying the execution window and, according to a predetermined time elapse or a touch input, it may change at least one of the shape, size, or placement position of the execution window.

The electronic device 300 may switch into the second shape of execution window by changing the size and/or placement position of the first shape of execution window, and the size of the second shape of execution window may be smaller than the size of the first shape of execution window.

Based on at least one other application running in the foreground, the electronic device 300 may resize and/or reposition the first shape of execution window not to overlap the respective execution screens (or execution windows) of the at least one other application, thereby switching into the second shape of execution window.

The operation method may further include identifying a user input to the first shape of execution window while displaying the first shape of execution window and pausing or resuming the application in response to the user input.

Switching the first shape of execution window into the second shape of execution window may include, when the application is a timer application, driving a timer function of the timer application with a set timer time, identifying a remaining time of the timer function while displaying the first shape of execution window including a progress of the timer function, and switching the first shape of execution window into the second shape of execution window corresponding to the identified remaining time.

Switching the first shape of execution window into the second shape of execution window in response to the identified remaining time may include changing at least one of a color effect, color, or saturation of the second shape of execution window in association with the remaining time of the timer function.

The operation method may further include identifying a user input to the first shape of execution window while displaying the first shape of execution window including the progress of the timer function and, when the user input is a touch and drag input, moving and displaying the first shape of execution window in a direction corresponding to the touch and drag input and, when the first shape of execution window at least partially departs from the display in response to the touch and drag input, switching the first shape of execution window into a third shape of execution window in response to the identified remaining time.

Referring to FIG. 5, when the application executable in the background is a timer application, a timer execution screen (or execution window) 510 occupying the entire display 360 may be displayed as shown in FIG. 5(a). Referring to FIG. 5(a), at least a portion (e.g., a lower end of the screen) of the execution screen 510 of the timer application may include an alarm function, a world time function, a stopwatch function, and a timer function. Further, in response to a user selection on the timer function, the electronic device 300 may display an execution screen 510 of the timer application including items for controlling the timer function, e.g., a remaining time of the timer function, and pause or cancel of the timer function. Further, when the timer function is executed, the progress time may be displayed on the execution screen 510. A timer time may be set by the user on the timer execution screen 510, and the electronic device 300 may drive the timer function of the timer application with the set timer time.

Referring to FIG. 5(b), in response to a background switch request for the timer application, the electronic device 300 may display the execution screen of the timer application including the progress of the timer function, as the first shape of execution window (e.g., PIP) 525, in at least a portion of the display 360. For example, a specific shape of execution window may be output in a popup type or floating type, and as an example, PIP is described below. The first shape of PIP 525 may include items for the remaining time of the timer function, pause or resume of the timer function, item for end of the timer function, and graphic element (or object) indicating the progress. In this case, when there is no other running application than the timer application, a first shape of PIP 525 may be displayed on the home screen 520 as shown in FIG. 5(b). In contrast, when there is at least one other running application, the first shape of PIP 525 may be displayed on the execution screen (or execution window) of the other application. The first shape of PIP 525 may be disposed so that it does not overlap the execution screen of the at least one other application.

The electronic device 300 may identify the state of the timer application while displaying the execution screen of the timer application including the progress of the timer function as shown in FIG. 5(b) in the first shape of PIP 525. Accordingly, the electronic device 300 may switch the first shape of PIP 525 into a second shape of PIP 535 as shown in FIG. 5(c) according to the state of the timer application. Further, the electronic device 300 may switch the execution screen of the timer application as shown in FIG. 5(a) into the second shape of PIP 535 immediately as shown in FIG. 5(c) according to the state of the timer application.

The electronic device 300 may switch into the second shape of PIP 535 based on the wait time while displaying the first shape of PIP 525. The electronic device 300 may switch into the second shape of PIP 535 based on the remaining time of the timer function, or the electronic device 300 may also switch into the second shape of PIP 535 based on the elapse of the set timer time. Further, in addition, the electronic device 300 may switch into another shape of execution window immediately upon receiving a user input to the shape of execution window currently displayed, regardless of the designated wait time, remaining time, and elapse of the timer time.

For example, based on the wait time, the electronic device 300 may identify whether the designated wait time has elapsed while displaying the execution screen of the timer application in the first shape of PIP 525 as shown in FIG. 5(b). If there is no user input until a predetermined time (e.g., N seconds) elapses, the electronic device 300 may switch the first shape of PIP 525 into a second shape of PIP 535 and display it on the home screen 530 as shown in FIG. 5(c). When there is a user input to the second shape of PIP 535 in FIG. 5(c), the electronic device 300 may switch the second shape of PIP 535 back into the first shape of PIP 525. For example, whereas the first shape of PIP 525 may include items for controlling the timer function as well as the remaining time, the second shape of PIP 535 may be a shape in which only the timer remaining time is displayed in the minimum size. Accordingly, the user may touch the second shape of PIP 535 to control the timer function and, in response to the touch, the electronic device 300 may switch into the first shape of PIP 525 including the items for controlling the timer function and display it.

Based on the remaining time of the timer function, the electronic device 300 may identify the remaining time of the timer function and switch the first shape of PIP 525 into the second shape of PIP 535 as shown in FIG. 5(c) in response to the identified remaining time. For example, when expiration of the remaining time is imminent, the electronic device 300 may switch the first shape of PIP 525 into the second shape of PIP 535 and display it and, upon displaying the second shape of PIP 535, change at least one of the color effect, color, or saturation of the second shape of PIP 535 in association with the remaining time of the timer function. For example, it is possible to effectively notify the user of the elapse of the set timer time or the remaining time by changing at least one of the color effect, color, or saturation of the second shape of PIP 535, and displaying it.

Based on the elapse of the set timer time, if the set timer time elapses, the electronic device 300 may display an execution screen including the excess time of the timer function in the second shape of PIP 535.

Meanwhile, the electronic device 300 may display the first shape of PIP 525 as shown in FIG. 5(b) in response to a background switch request in the state of displaying the execution screen of FIG. 5(a). However, if such an occasion occurs in which PIP 525 overlaps the execution screens of other running applications, as shown in FIG. 5(d), the electronic device 300 may place the second shape of PIP 535 as shown in FIG. 5(d), not the first shape of PIP 525, in a position that does overlap the other execution screens 540, in response to the background switch request.

Referring to FIG. 6, if the application executable in the background is a video playback application, the electronic device 300 may display a first shape of PIP 610 in at least a portion of the display 360 as shown in FIG. 6(a) in response to a background switch request. Referring to FIG. 6(a), the first shape of PIP 610 may include items related to control of the video playback application, e.g., previous, play or pause, go back, or end, along with the content of the video playback application. For example, the content of the video playback application may be played through the first shape of PIP 610. If the playback of the content is paused upon reception of, or without, a user input to an object (e.g., pause) included in the first shape of PIP 610 as shown in FIG. 6(a), the electronic device 300 may display the paused content through the first shape of PIP 620, which is the same as the first shape of PIP 610, as shown in FIG. 6(b). Further, when play is resumed as shown in FIG. 6(b), e.g., when a user input to an object (e.g., play) included in the first shape of PIP 620 is received, it may be switched back to the first shape of PIP 610 as shown in FIG. 6(a). If the play of content is complete through the first shape of PIP 610 of FIG. 6(a), it may immediately be switched into a third shape of PIP 640 of FIG. 6(d). Further, if no user input is made for a predetermined time (e.g., N seconds) while displaying the first shape of PIP 620 in FIG. 6(b), e.g., after the predetermined time elapses, the electronic device 300 may switch the first shape of PIP 620 into a second shape of PIP 630 as shown in FIG. 6(c) and display the paused content using the second shape of PIP 630. As such, when no user input is made until the predetermined wait time elapses, it may be a state in which there is no intent for the user to actively use the application running in the background. Thus, a resized and reshaped PIP may be displayed.

Meanwhile, if no user input is made for the predetermined time in the playback-complete state or paused state, the electronic device 300 may display the third shape of PIP 640. The third shape of PIP 640 may represent a state in which content playback is complete.

Further, even when there is no user input for the predetermined time (e.g., N seconds) even after the PIP has been changed into the second shape of PIP 630 that is then displayed in FIG. 6(c), the electronic device 300 may change the second shape of PIP 630 into the third shape of PIP 640 as shown in FIG. 6(d). The electronic device 300 may switch the currently displayed shape of execution window into another shape of execution window immediately when receiving a designated user input, e.g., a double tap, to the currently displayed shape of execution window regardless of the wait time for waiting a user input.

As shown in FIG. 6(a), the content of the video playback application may be played through the first shape of PIP 610 and, if the playback of the content is complete, the electronic device 300 may change the first shape of PIP 610 into the third shape of PIP 640 as shown in FIG. 6(d). For example, the third shape of PIP 640 may include an image (or thumbnail image) of the completely played content and may include minimum functional items, e.g., a play button. Accordingly, if the user touches the third shape of PIP 640, the third shape of PIP 640 may return to the first shape of PIP 610 as shown in FIG. 6(a). Meanwhile, although FIG. 6 describes an example in which the shape of PIP is changed based on the execution state of the application and a user input, and a predetermined time elapse, the placement position may be changed, as well as the shape of the PIP. For example, when at least one other application is running in the foreground, the placement position as well as the shape of PIP may be changed so that it does not overlap the respective execution windows of the at least one other application.

As described above, the electronic device 300 may identify the state of the video playback application, determine a graphic object and information to be displayed, based on at least one of the identified state, wait time, or touch input, and determine the PIP shape and placement position including the determined information and object. Accordingly, it is possible to allow the user to effectively check, at a glance, the application being currently used and the video playback application running in the background even without executing the previously used video playback application back in the foreground.

Figure 7:
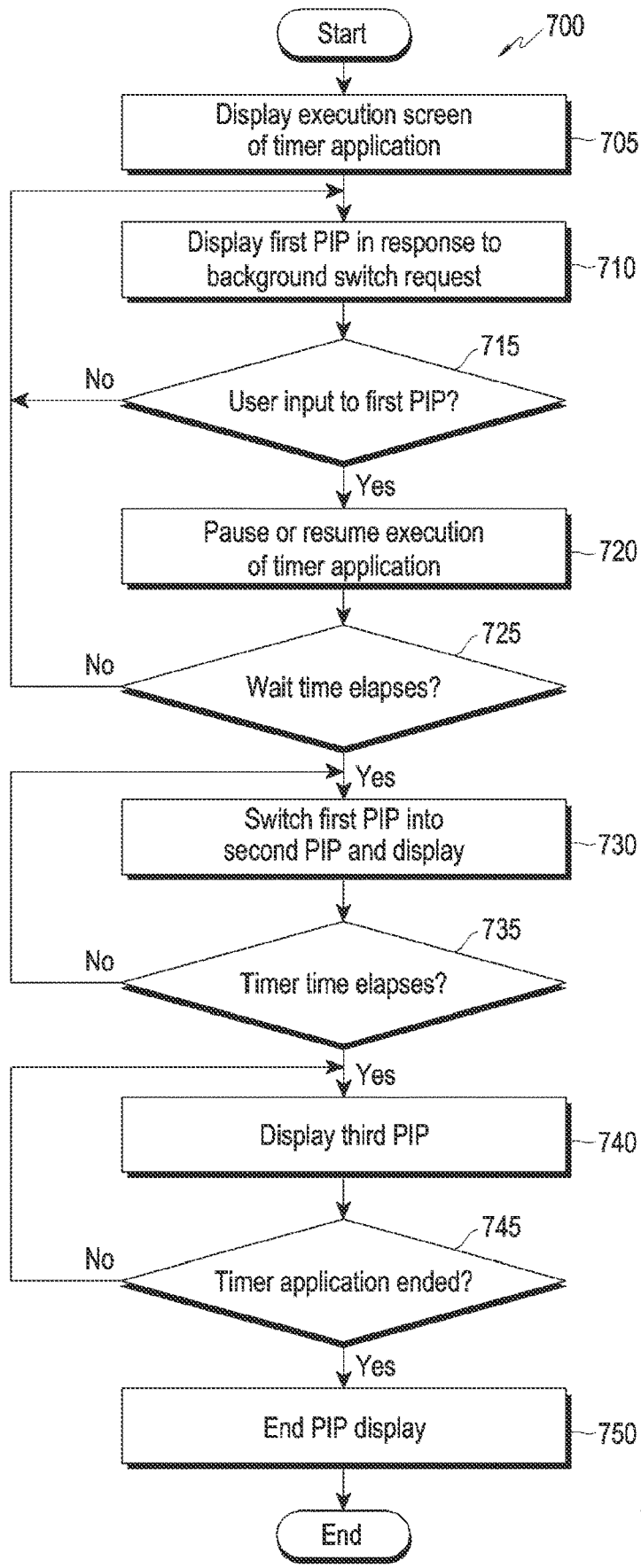
FIG. 7 is a flowchart illustrating operations of an electronic device to display an execution screen of an application according to an embodiment.

FIG. 7 is a flowchart 700 illustrating detailed operations of an electronic device to display an execution screen of an application according to an embodiment. Referring to FIG. 7, the operation method may include operations 705 to 745. Each step/operation of the operation method for FIG. 7 may be performed by an electronic device 300. At least one of operations 705 to 745 may be omitted, some operations thereof may be performed in reverse order, or other operations may be added thereto. The operations of the electronic device are described in detail with reference to FIG. 8, which illustrates various types of execution windows of a timer application according to an embodiment.

In operation 705, the electronic device 300 may display an execution screen of a timer application. In operation 710, the electronic device 300 may display a first PIP in response to a background switch request. The display of PIP may be set as default on, and the PIP display function may be activated (or on) or deactivated (or off) through the settings menu.

The electronic device 300 may change the timer application in the foreground state into the background state when the user inputs user manipulation for using another application or by a user input for switching the screen into the home screen of the electronic device 300. Here, the timer application switched into the background state may be switched into the background state, with it running or stopped from running.

Figure 8:
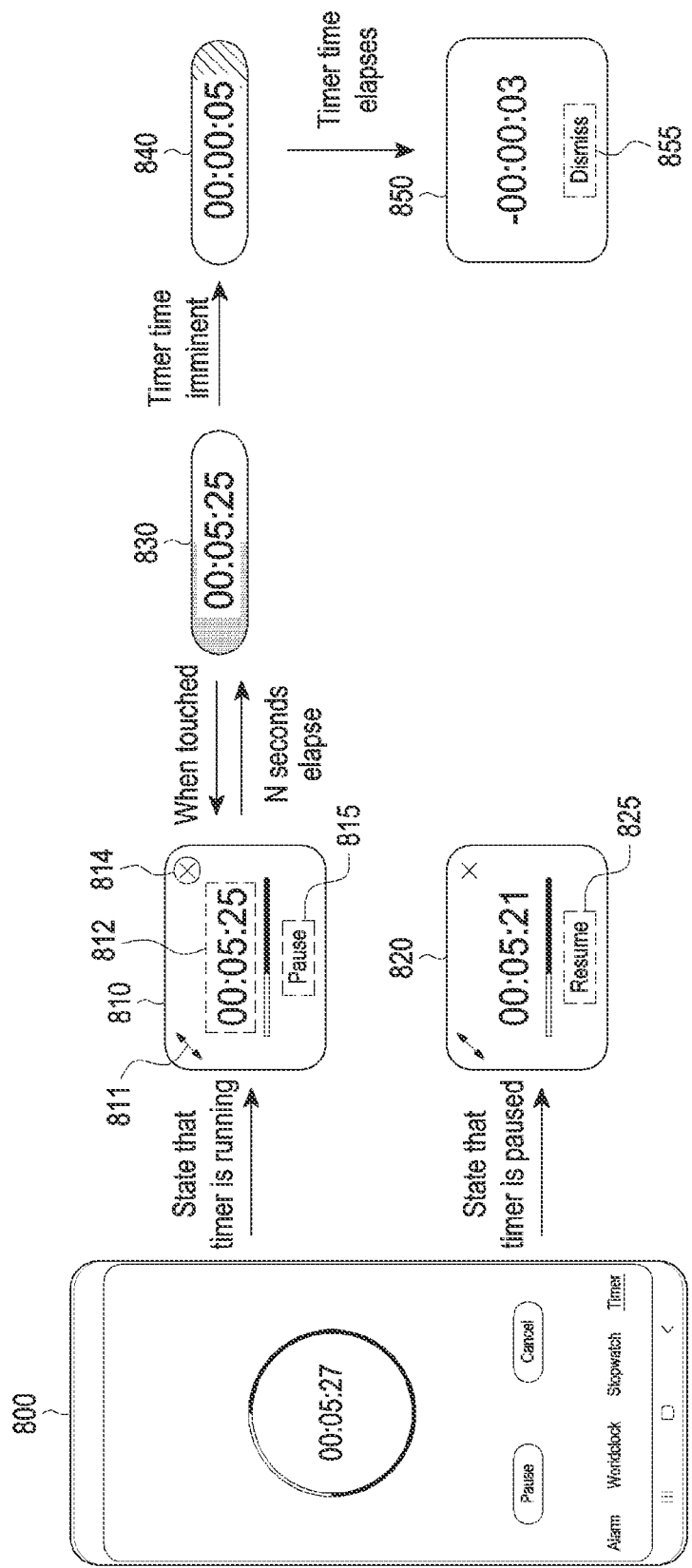
FIG. 8 is a diagram illustrating various types of execution windows of a timer application according to an embodiment.

Referring to FIG. 8, the electronic device 300 may execute the timer application, and the execution screen 800 of the timer application running in the foreground may be displayed to occupy the entire display. Upon switching into the background in a state in which the timer application is running, e.g., time running (or in progress), the electronic device 300 may display a first PIP 810 including a pause button 815. For example, the first PIP 810 may be displayed in at least a portion of the display 360 and may provide at least some of timer information 812 (e.g., remaining time and elapsed time) provided by the timer application and such functions (or objects, menu, or icons) as start, pause 815, resume, return 811 (e.g., return to the foreground), and end 814 (e.g., end of PIP display or end of timer application), for controlling the timer application.

In contrast, upon switching into the background in the execution-paused state, e.g., timer paused state, the electronic device 300 may display a first PIP 820 including a resume button 825. As shown in FIG. 8, although the first PIP 810 and the first PIP 820 displayed upon switching into the background may remain in the same shape and placement position, items displayed may be varied depending on the execution state of the timer application.

In operation 715, the electronic device 300 may identify whether a user input to the first PIP is received. For example, the user input may include a touch input. In response to the user input to the first PIP, the electronic device 300 may pause or resume the timer application in operation 720. For example, the electronic device 300 may pause the timer function, which is running, or resume the paused timer function according to the user input. In contrast, as long as no user input to the first PIP is received, the electronic device 300 may return to operation 710 and keep on displaying the first PIP. Referring to FIG. 8, if a user input to the first PIP 810 (or a button 815 in the first PIP 810) is received, the electronic device 300 may pause the timer application and, if a user input to the first PIP 820 (or a button 825 in the first PIP 810) is received, resume the timer application.

In operation 725, the electronic device 300 may identify whether the wait time elapses. In response to the elapse of the wait time, the electronic device 300 may switch the first PIP into a second PIP and display it in operation 730. FIG. 7 describes an example in which switching into the second PIP occurs when the wait time elapses. However, without being limited thereto, the first PIP may be switched into the second PIP in response to a designated user input. In contrast, the above-described operations may be repeated as long as the wait time does not elapse. For example, referring to FIG. 8, if a predetermined time (e.g., N seconds) elapses, the electronic device 300 may switch the first PIP 810 (or first PIP 820) into the second PIP 830 and display it. For example, the second PIP 830 may have a smaller size and shape than the first PIP 810 (or first PIP 820) and may thus display fewer items. For example, the second PIP 830 may provide only timer information (e.g., remaining time and elapsed time) 812 which is provided by the timer application. A change to the execution state of the application (e.g., timer remaining time) may be indicated by changing the color or saturation output in the second PIP 830 (e.g., PIP background), or the size of the graphic element filling (or occupying) the PIP. Since the size of the second PIP 830 is limited, it may be returned to the first PIP 810 (or first PIP 820) as necessary, to control the timer function. For example, when the user touches the second PIP 830, the second PIP 830 may switch into the first PIP 810 (or first PIP 820). As such, when the PIP 830 in smaller size is touched, it may be returned to the first PIP 810 (or first PIP 820) in the original size.

In operation 735, the electronic device 300 may identify whether the timer time elapses. In response to the elapse of the timer time, the electronic device 300 may display a third PIP in operation 740. Here, the third PIP may be one resulting from changing at least one of the color effect, color, or saturation of the second PIP 830. In operation 745, the electronic device 300 may identify whether the timer application is ended and, if the timer application is ended, stop displaying the PIP in operation 750. For example, the electronic device 300 may end the PIP display in response to a user input to select the end 814 included in the first PIP 810. The above-described operations may be performed as long as the timer application is not ended.

Referring to FIG. 8, if the set timer time elapses while displaying the second PIP 830, the excess time may be displayed using the second PIP 840. Alternatively, before the timer time expires, the remaining time may be displayed using the second PIP 840. For example, it is possible to indicate that the remaining time is imminent by changing the color or saturation output in the second PIP 840 or the size of the graphic element filling (or occupying) the PIP. Further, after the timer time elapses, the electronic device 300 may switch into another shape of third PIP 850 and display it. For example, the third PIP 850 may include the elapsed time and a button 855 for releasing or dismissing the timer function.

The PIPs 810, 820, 830, 840, and 850 of FIG. 8, although different in shape and displaying different items, may be moved and placed automatically or according to a user input (e.g., a touch-and-drag input) so as to not overlap other execution screens. A movement of a PIP based on a user input is described below in detail with reference to FIGS. 9 to 11. Moving and placing a PIP automatically so as to not overlap other execution screens is described with reference to FIGS. 12 and 13.

Figure 9:
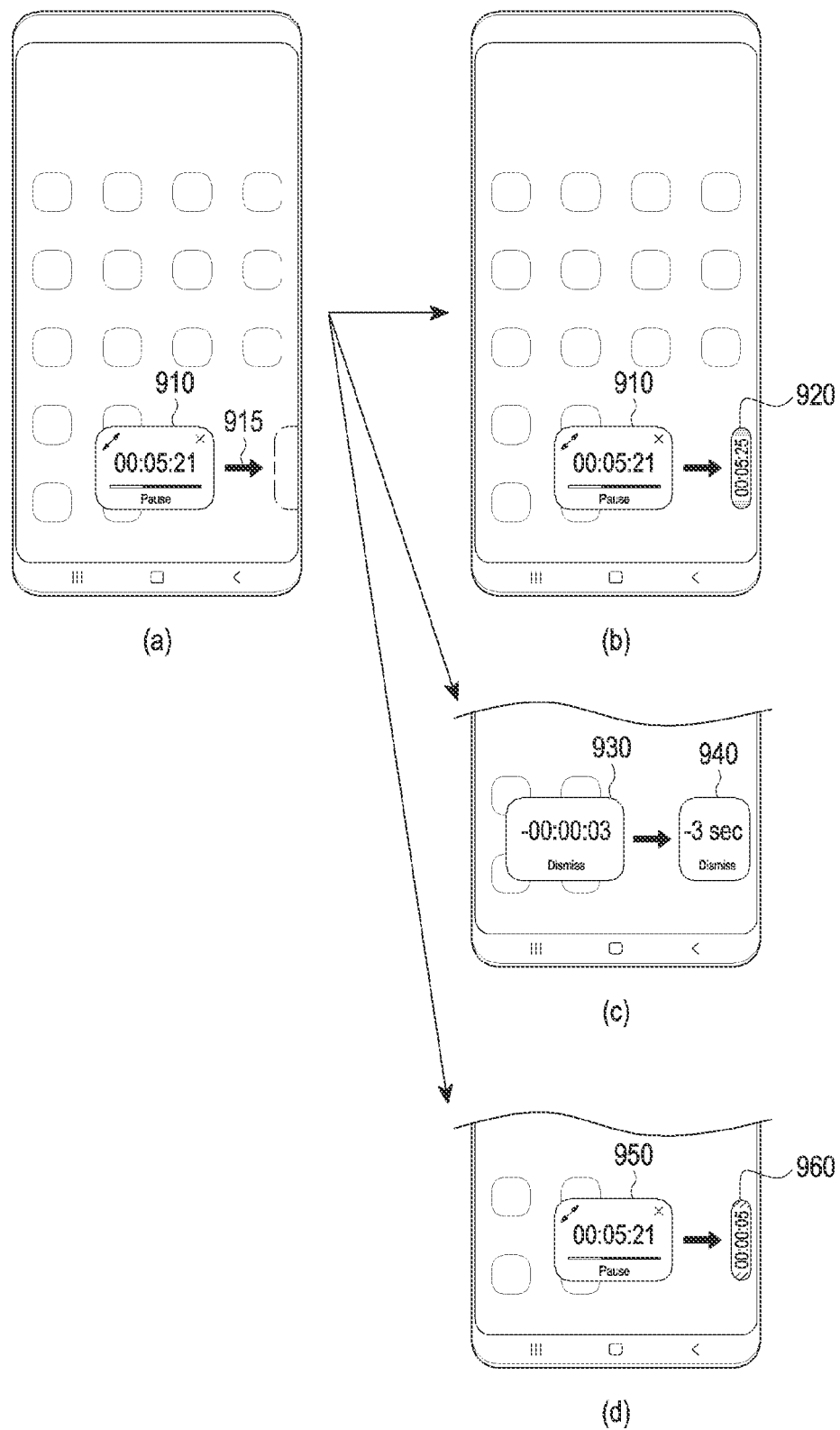
FIG. 9 illustrates an execution window that is varied based on an elapsed time and movement of a timer application according to an embodiment.

FIG. 9 illustrates an execution window that is varied based on an elapsed time and movement of a timer application according to an embodiment.

Referring to FIG. 9(a), the electronic device 300 may display a first PIP 910 for a timer application running in the background in at least a portion of the display 360. For example, if the user touches and drags the first PIP 910 in a first direction 915, the first PIP 910 may be changed into a second PIP 920 that is then displayed as shown in FIG. 9(b). If the first PIP 910 departs by a predetermined proportion out of the display 360 according to the moving distance and direction corresponding to the touch and drag input, e.g., if ⅔ or more of the first PIP 910 departs out of the screen or moves to the edge area of the display 360, the electronic device 300 may minimally display the execution state of the timer application. For example, the electronic device 300 may change the first PIP 910 into a second PIP 920 and display it in an area that does not overlap the objects representing other applications as shown in FIG. 9(b). For example, the electronic device 300 may display the second PIP 920 in the edge area of the display 360 corresponding to the moved direction and position of the first PIP 910. In this case, the second PIP 920 may be a fourth shape of PIP that may be placed in the edge area. The fourth shape of PIP may be smaller in size than the first shape of PIP and may include only some information and objects (menu, icons, etc.). Here, the fourth shape of PIP may be varied in displayed content, such as size, color, shape, or displayed information, depending on the state (e.g., remaining time, play, pause) of the application.

If the set timer time elapses, the first PIP 930 including the elapsed time and release button may be displayed. The first PIP 930 moved according to the moving distance and direction corresponding to the touch and drag input may be changed into the third PIP 940 that is then displayed as shown in FIG. 9(c). For example, the third PIP 940 may include a further downsized release button along with an elapsed time displayed in fewer units than the elapsed time included in the first PIP 930.

FIG. 9(b) describes an example of changing the first PIP 910 into the second PIP 920 and displaying it based on the degree of departing from the screen. However, the shape and placement position of the PIP may be determined based on the degree of the remaining time when moved according to the moving distance and direction corresponding to the touch and drag input. For example, as shown in FIG. 9(d), the electronic device 300 may identify the remaining time when a touch and drag input is made to the first PIP 950 and, if the remaining time is a predetermined threshold time or more, i.e., if a large amount of time remains to the set timer time, display the second PIP 960 reduced in the minimum size so as not to disturb other operations. Here, although the second PIP 920 of FIG. 9(b) and the second PIP 960 of FIG. 9(d) may be identical in shape and placement position, they may be implemented to differ in at least one of color effect, color, or saturation, as well as the units (e.g., minutes and seconds) of the remaining time.

Figure 10:
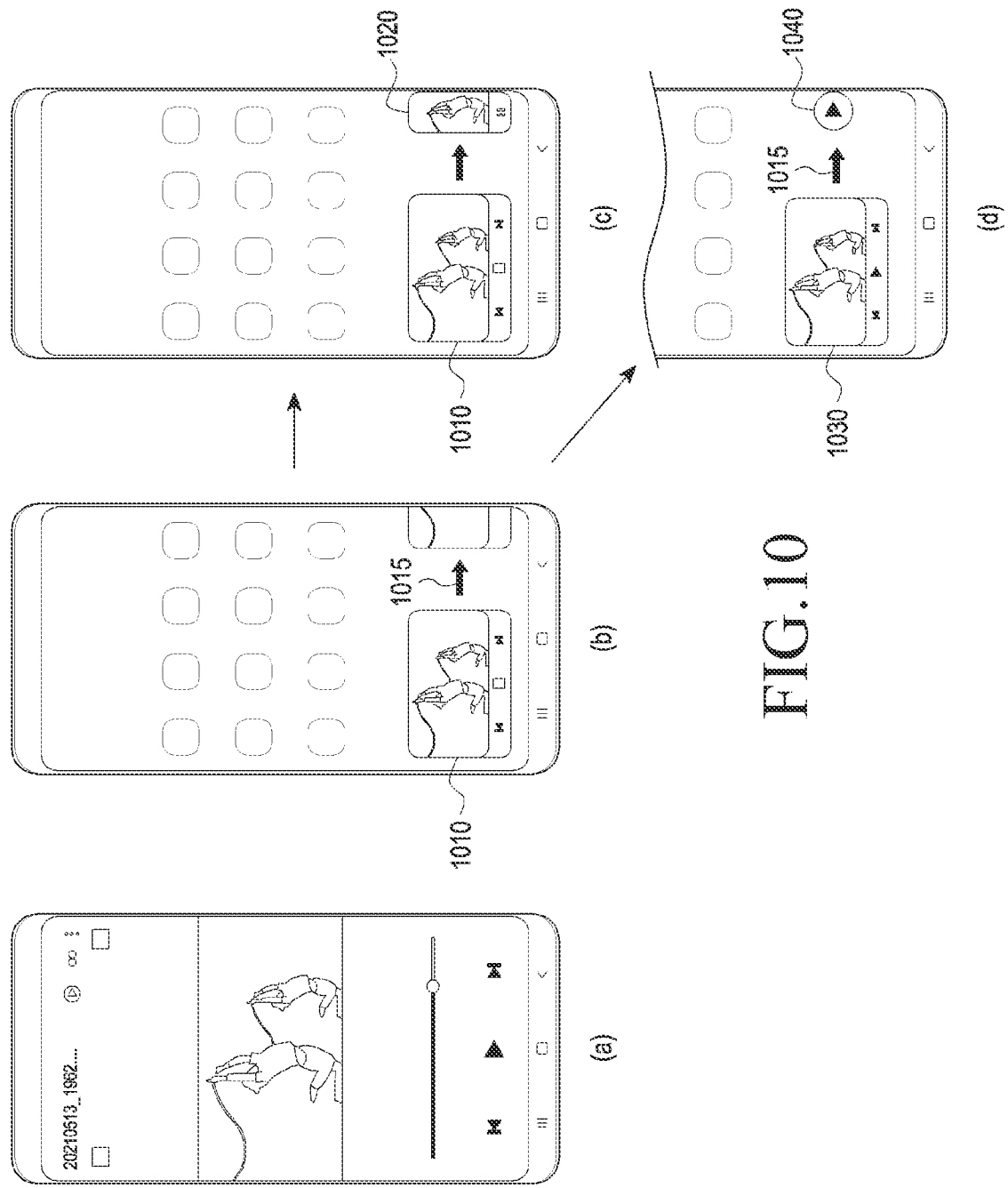
FIG. 10 illustrates an execution window that is varied based on an elapsed time and movement of a video playback application according to an embodiment.

FIG. 10 illustrates an execution window that is varied based on an elapsed time and movement of a video playback application according to an embodiment.

Referring to FIG. 10, the electronic device 300 may display an execution screen of a video playback application as shown in FIG. 10(a) and, in response to a background switch request, display a first PIP 1010 for the video playback application running in the background as shown in FIG. 10(b). For example, if the user touches and drags the first PIP 1010 in a first direction 1015, the first PIP 1010 may be moved to the position corresponding to the touch and drag input as shown in FIG. 10(b), and it may be changed into a second PIP 1020 based on the degree of departing from the screen and displayed. For example, the electronic device 300 may display the second PIP 1020 which has a shape placeable in the edge area of the display 360 corresponding to the moved direction and position of the first PIP 1010. In this case, the shape of the PIP displayed according to when no user input is made to the first PIP 1010 for a predetermined wait time and the shape of the PIP displayed according to partially departing from the display 360 may be identical to or differ from each other. As shown in FIG. 10(b), the second PIP 1020 may be smaller in size than the first PIP 1010 and may include fewer components (e.g., icons, objects, or menu). For example, the second PIP 1020 may include the content of the video playback application and minimum buttons for controlling the operation. The content output through the first PIP 1010 may be changed into the in-play state or paused state according to a touch input to the first PIP 1010. Likewise, the content output through the second PIP 1020 may also be changed into the in-play or paused state according to a touch input to the second PIP 1020. If changed into the paused state, preview content may be displayed on the second PIP 1020.

Meanwhile, the electronic device 300 may display a fourth PIP 1040 according to a touch and drag input to the third PIP 1030 corresponding to the playback-complete state or stopped state in the first direction 1015. The fourth PIP 1040 is one resulting from changing at least one of the size, placement position, or shape of the second PIP 1020 and may represent a state in which the playback of the content is complete.

Further, as an example, even when the second PIP 1030 in the paused state is touched and dragged by the user, the fourth PIP 1040 may be moved and displayed in the position corresponding to the touch and drag input as shown in FIG. 10(c).

The first PIP 1010 may be switched into the second PIP 1020 or the fourth PIP 1040 that is then displayed, according to the operation state of the application when the PIP is moved according to the touch and drag input.

Figure 11:
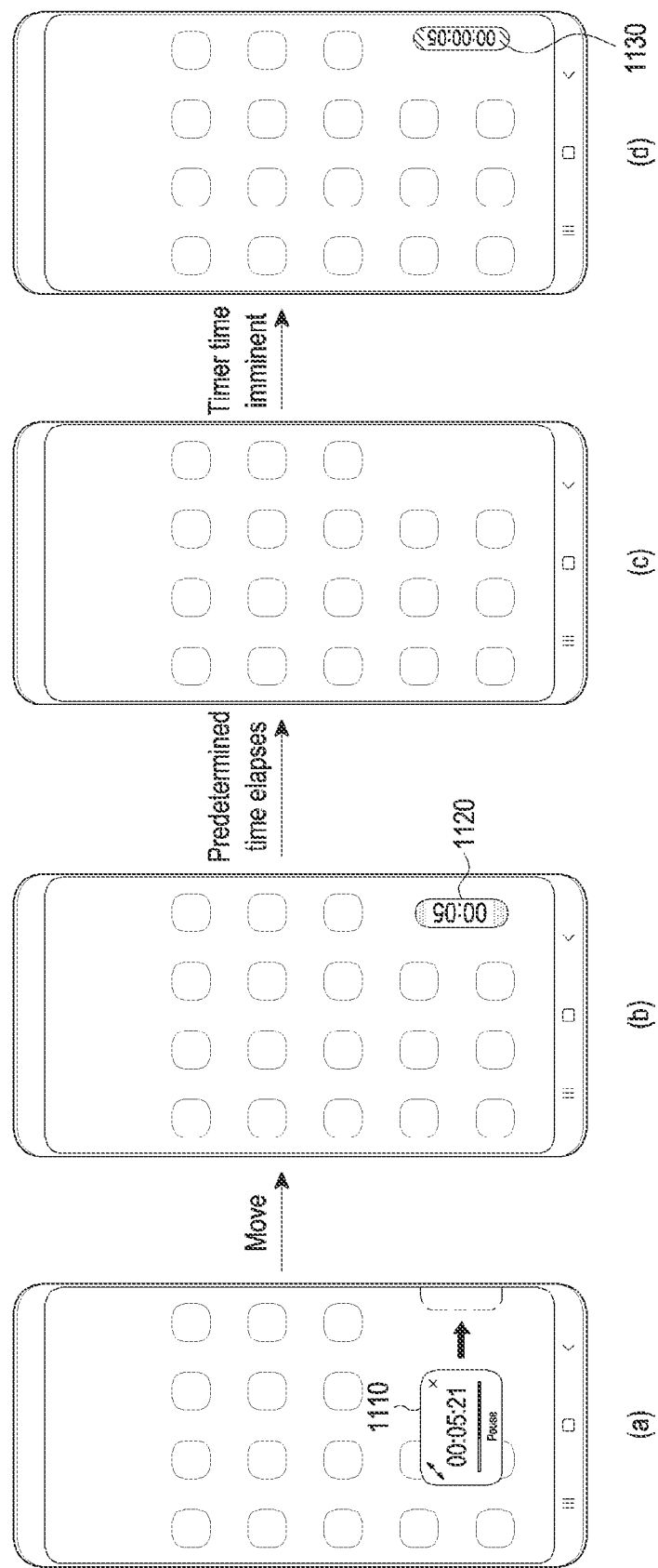
FIG. 11 illustrates an example of displaying an execution window according to an elapsed time for a timer application according to various embodiments.

FIG. 11 illustrates an example of displaying an execution window according to an elapsed time for a timer application according to an embodiment. FIG. 11 illustrates an example in which when a large amount of remaining time remains, a PIP is temporarily hidden and, when the expiration time is reached (e.g., arrival of the timer time or alarm time), it is displayed back.

Referring to FIG. 11(a), in a case where a first PIP 1110 is moved over a predetermined proportion out of the display 360 in response to a touch and drag input to the first PIP 1110, an area which does not overlap another application or the execution screen (or execution window) of the application may be identified, and a second PIP 1120 may be moved to the area identified in response to the touch and drag input as shown in FIG. 11(b). For example, the second PIP 1120 may include an elapsed time (e.g., hours and minutes) with fewer units to be displayed in a minimum space, and at least one of the color effect, color, or saturation of the second PIP 1120 may be changed. When a predetermined time elapses without a user input while the second PIP 1120 is displayed in FIG. 11(b), the second PIP 1120 may be processed so as not to be shown, as shown in FIG. 11(c), and when expiration of the timer time is imminent (e.g., 5 seconds before the timer time expires) may also be displayed back in the third PIP 1130 as shown in FIG. 11(d). For example, the third PIP 1130 may include the remaining time in the full units (e.g., hours, minutes, and seconds) and, to indicate imminency, at least one of the color effect, color, or saturation may be changed to differ from that of the second PIP 1120.

Figure 12:
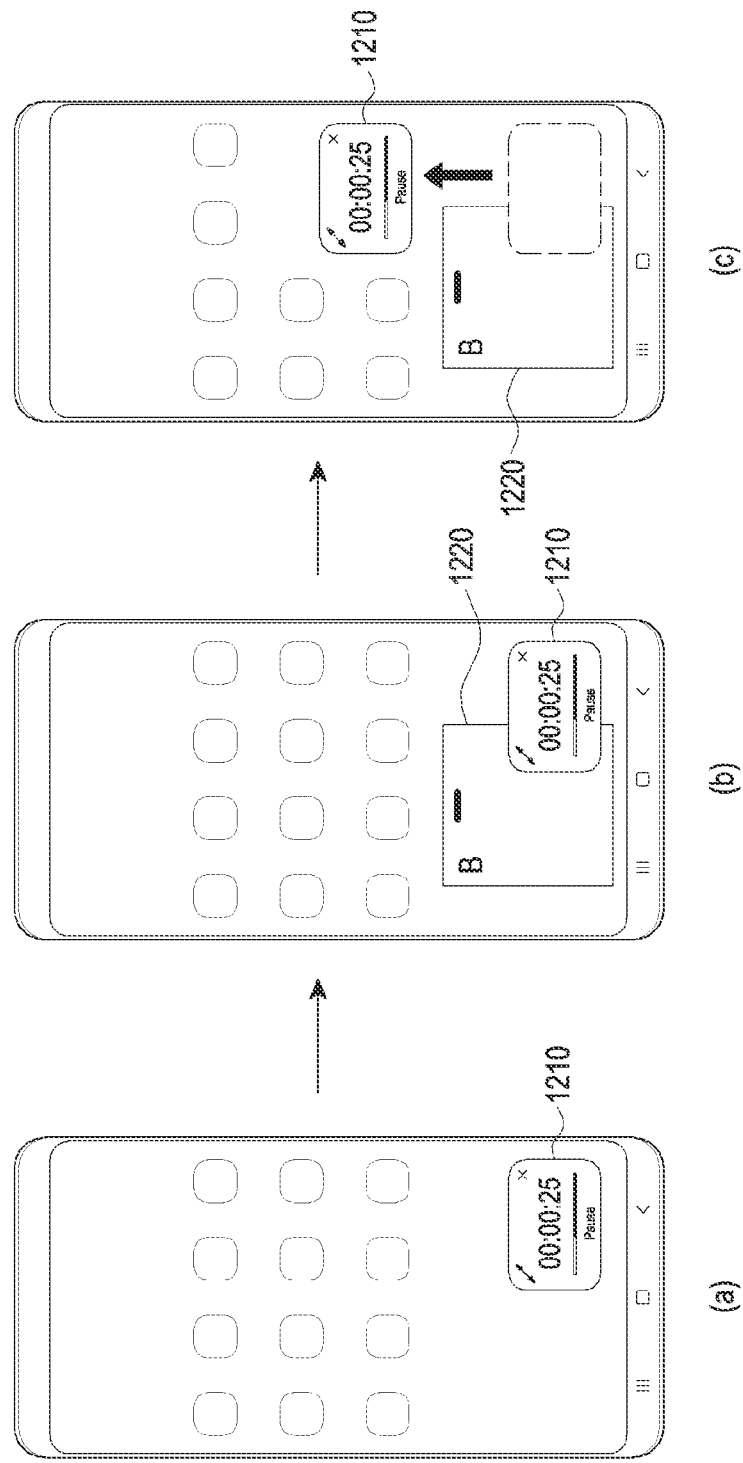
FIG. 12 illustrates automatic placement of an execution window related to a timer application according to an embodiment.
Figure 13:
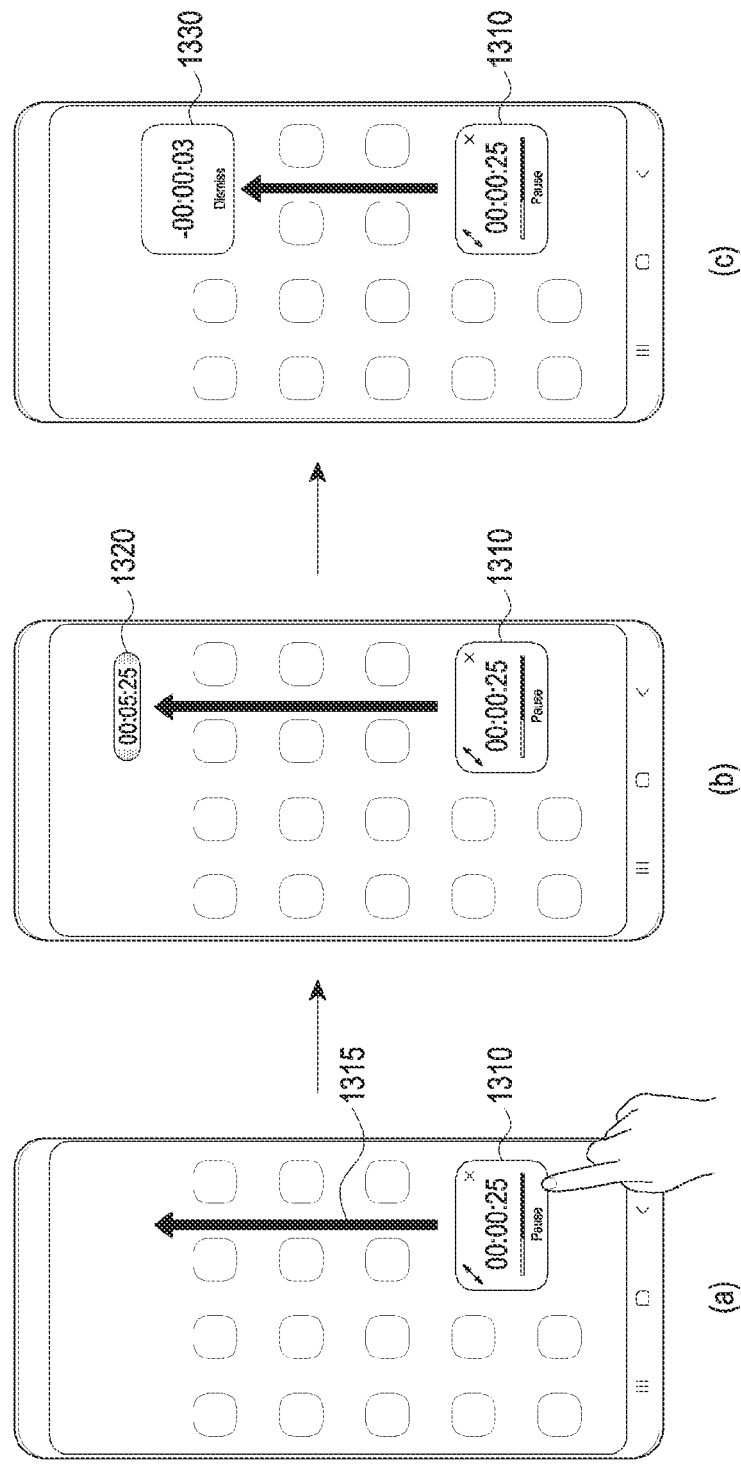
FIG. 13 illustrates an example of displaying and automatically placing an execution window according to an execution state for a timer application according to an embodiment.

Automatically moving and placing a PIP not to overlap other execution screens is described with reference to FIGS. 12 and 13. FIG. 12 illustrates automatic placement of an execution window related to a timer application according to an embodiment. FIG. 13 illustrates an example of displaying and automatically placing an execution window according to an execution state for a timer application according to an embodiment.

When the user inputs a user manipulation to use another application as shown in FIG. 12(b) in a state in which a PIP 1210 is already running in relation to a timer application as shown in FIG. 12(a), a popup window 1220 may be displayed. In this case, such an occasion may arise where the PIP 1210 overlaps another layer, e.g., the popup window 1220. When the popup window 1220 is displayed, the electronic device 300 may identify whether it overlaps the PIP 1210 and, even when an overlap occurs, automatically move and place the PIP 1210 as shown in FIG. 12(c). The electronic device 300 may also change the shape and size of the PIP 1210 when moved and placed. In this case, the PIP may be resized and automatically placed when the user touches the periphery of the PIP 1210 or through a shaking motion.

FIG. 13 is an example of automatic placement of a PIP considering the execution state of an application.

Referring to FIG. 13(a), when the user touches and drags a first PIP 1310 in a first direction 1315, a second PIP 1320 or a third PIP 1330 in a different form may be displayed as shown in FIG. 13(b) or FIG. 13(c) depending on the execution state of the application. For example, if the placement space is insufficient, and the set timer time remains within a predetermined time or more, the first PIP 1310 may be changed into a second PIP 1320 that is then displayed, in a minimum space as shown in FIG. 13(b).

In contrast, if the set timer time elapses, and the placement space is insufficient, the user needs to be led to release the timer function. Thus, the electronic device 300 may display a partially overlapping third PIP 1330 although partially hiding another application or execution screen as shown in FIG. 13(c). Although there is a touch and drag input from the user, the electronic device 300 may automatically place the PIP considering the execution state of the application and the placement space as described above.

Figure 14:
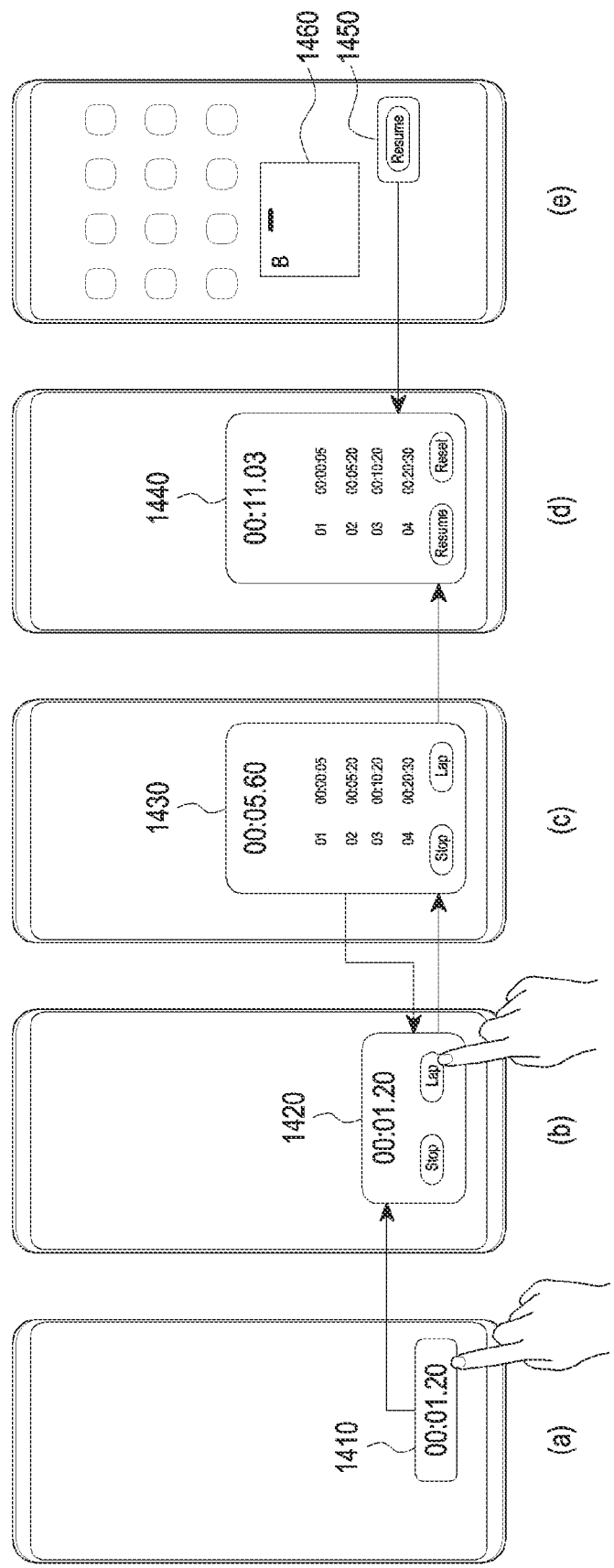
FIG. 14 illustrates an execution window for a stopwatch of a timer application according to an embodiment.

FIG. 14 illustrates an execution window for a stopwatch of a timer application according to an embodiment. FIG. 14 illustrates examples of displaying a PIP corresponding to a stopwatch function.

Referring to FIG. 14(a), if the user touches a minimum size of first PIP 1410 in relation to the stopwatch function, a second PIP 1420 may be displayed which includes the functions (e.g., stop and lap) of the stopwatch along with the elapsed time, as shown in FIG. 14(b).

If the user selects the lap function or zooms out on the second PIP 1420 in FIG. 14(b), the electronic device 300 may display a third PIP 1430, as shown in FIG. 14(*c*). The third PIP 1430 may include records related to the stopwatch function. If no user input is made for a predetermined time while displaying the third PIP 1430 including the records, e.g., if the user does not press the lap function for the predetermined time, the third PIP 1430 may be returned to the second PIP 1420 in the prior size. In contrast, if the stop function is selected by the user while displaying the third PIP 1430, a fourth PIP 1440 including final records may be displayed, as shown in FIG. 14(*d*). In this case, when no user input occurs for the predetermined time, e.g., if the predetermined elapses with the stopwatch function stopped, the electronic device 300 may display a fifth PIP 1450 changed to the minimum size in a position where the execution screen of another application or the popup window 1460 is not hidden, as shown in FIG. 14(*e*).

Figure 15:
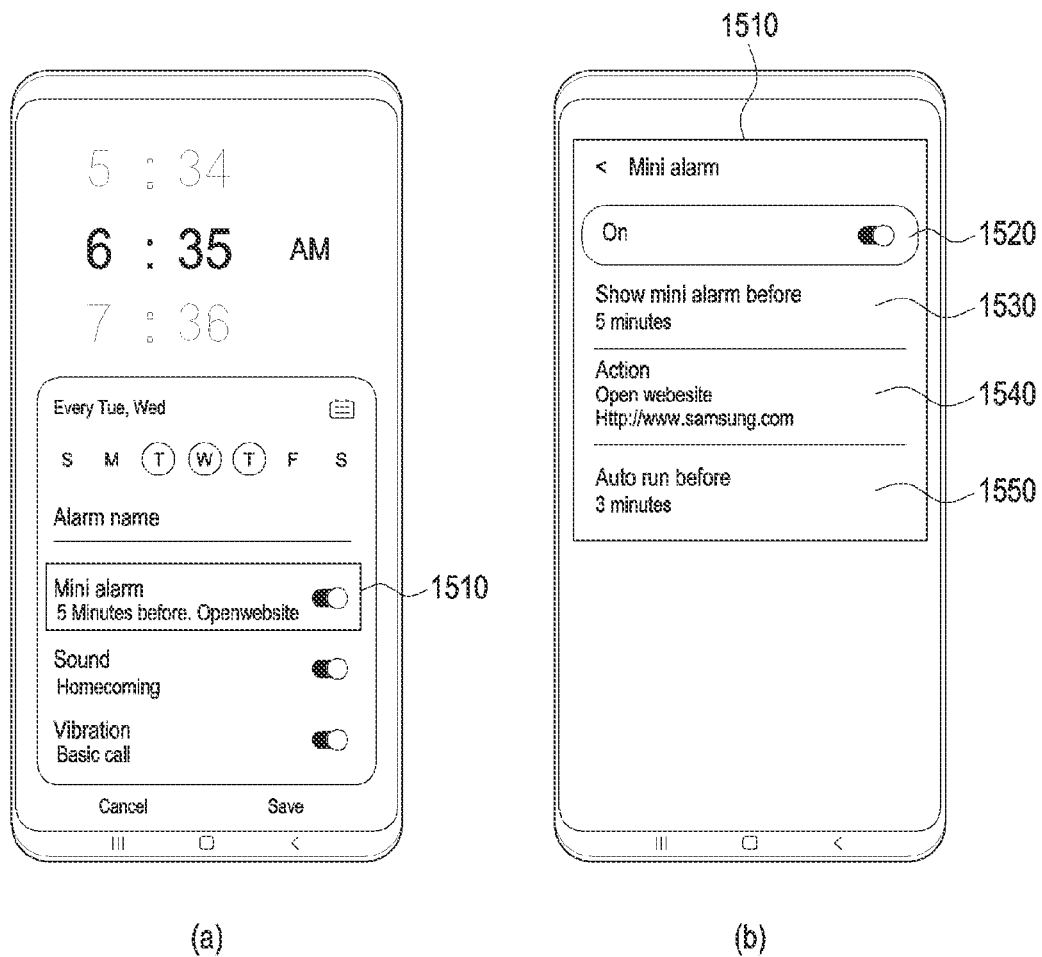
FIG. 15 illustrates a screen for setting an alarm according to an embodiment.

FIG. 15 illustrates a screen for setting an alarm according to an embodiment.

Functions that may be provided by the timer application may include an alarm function and a stopwatch function in addition to the timer function. FIG. 15 is an example of settings for displaying a PIP associated with the alarm function among these functions.

Referring to FIG. 15(*a*), the mini alarm function 1510 may indicate a function for activating or deactivating the display of the PIP related to the alarm function. For example, if the user selects the mini alarm function 1510, the electronic device 300 may display a detailed alarm settings screen related to the mini alarm function as shown in FIG. 15(*b*).

As shown in FIG. 15(*b*), the alarm settings screen related to the mini alarm function 1510 may include at least one of an item 1520 for activating or deactivating the PIP display related to the alarm function, an item 1530 for setting a time for displaying the PIP, an item 1540 for setting an operation related to the mini alarm, and an item 1550 for setting automatic execution. Accordingly, the user may select a PIP detailed settings item on the alarm settings screen.

For example, when the PIP display related to the alarm function is turned on, the alarm function may always be displayed on the screen even when the timer application is switched into the background. Further, through the items 1530, 1540, and 1550, the user may set a timing for PIP display related to the alarm function, an application or website to be executed with a shortcut, and a timing for automatic execution when the shortcut is not executed.

Figure 16:
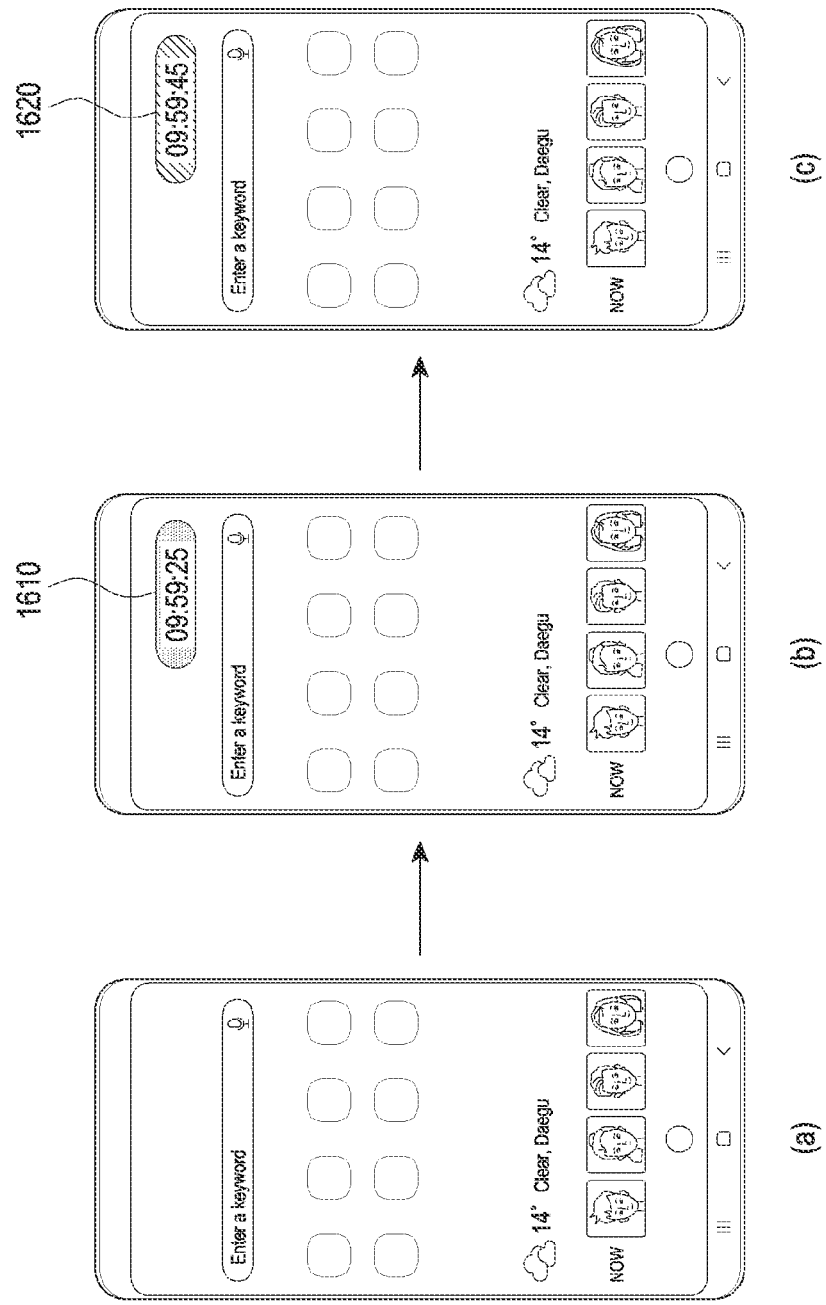
FIG. 16 illustrates an example of displaying an execution window when an alarm time arrives according to an embodiment.

FIG. 16 illustrates an example of displaying an execution window when an alarm time arrives according to an embodiment. For example, the time for displaying the mini alarm on the alarm settings screen as shown in FIG. 15(*b*) may be set to 10 minutes before, and the electronic device 300 may count the set alarm time in a state of displaying the screen as shown in FIG. 16(*a*). If it is 10 minutes before the alarm time, the electronic device 300 may display a PIP 1610 including the units of the remaining time as shown in FIG. 16(*b*). In other words, up to 10 minutes before the alarm time, the PIP 1610 may be in a hidden state. Further, a PIP 1620 resulting from changing at least one of the color effect, color, or saturation depending on the degree of the remaining time may be displayed as shown in FIG. 16(*c*). The user may be notified of the degree of the remaining time using an alarm output method, such as vibration or sound, as well as the method of changing the display of the PIP 1620. As such, the electronic device 300 may provide a visual effect even without disturbing other tasks by applying the highest priority to the PIP display related to the alarm function, thereby increasing the user's visibility. For example, the electronic device 300 may display the remaining time in units including seconds in the PIP from one minute before the alarm goes off when on-time access, such as for course sign-up or ticketing, is required.

Figure 17:
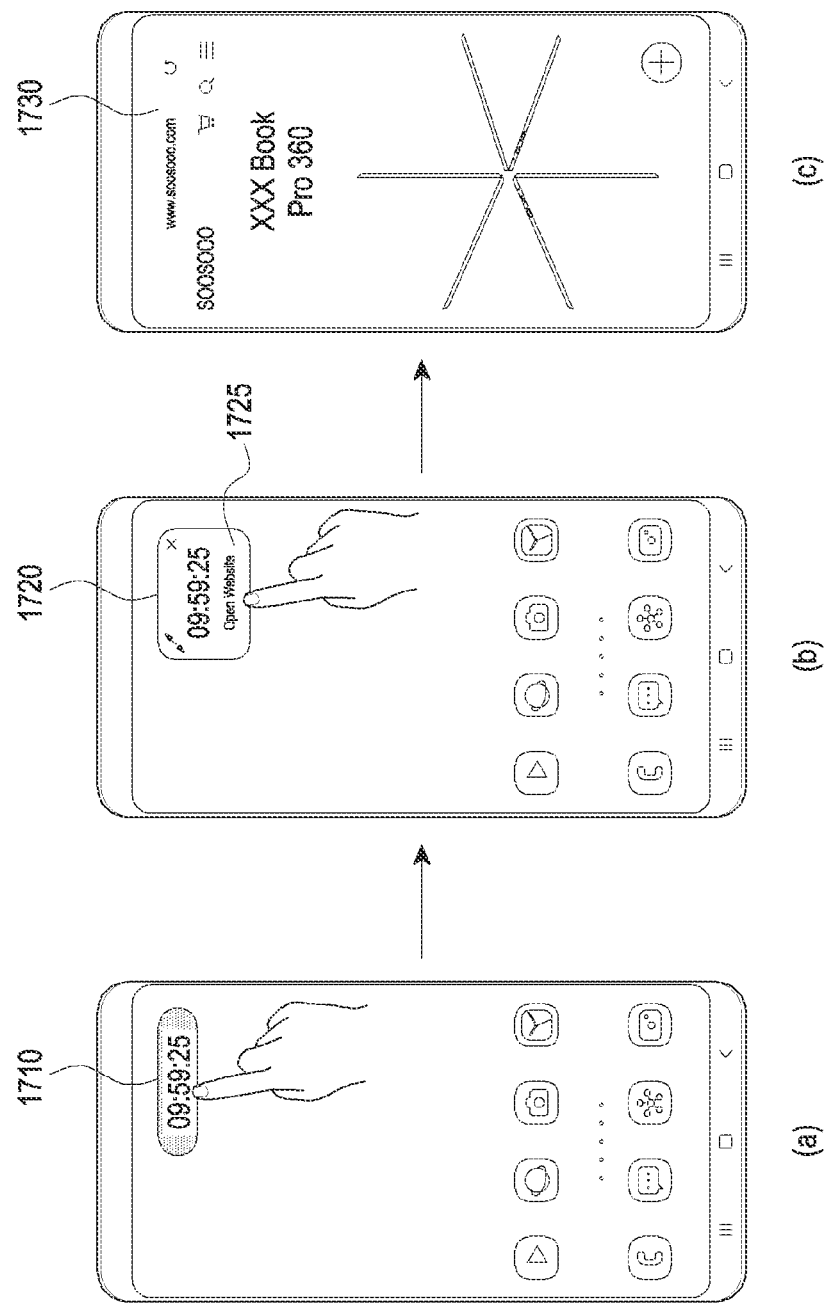
FIG. 17 illustrates a webpage connection screen corresponding to a user input to an execution window when an alarm time arrives according to an embodiment.

FIG. 17 illustrates a webpage connection screen corresponding to a user input to an execution window when an alarm time arrives according to an embodiment.

Referring to FIG. 17(*a*), if at least one condition for PIP display related to the alarm function is met, the electronic device 300 may display a PIP 1710 including the remaining time in relation to the set alarm function.

The user may be provided with a preview to guide the user to the content for which the alarm has been set. For example, as shown in FIG. 17(*b*), a PIP 1720 may be displayed which includes information 1725 to indicate the remaining time and the set content. In this case, the user may touch the PIP 1720 to identify the details of the information 1725 and, in response to the touch, at least one of the shape or size of the PIP 1720 may be changed. For example, the detailed settings (e.g., an application or website to be executed with a shortcut) may be provided through the resized PIP to the user in the form of a preview. Here, the resized PIP may occupy the entire screen of the display 360 or may be larger in size than the PIP 1720. For example, the preview may contain, e.g., a website shortcut, real-time streaming video, a thumbnail, and a description of the content. Further, if the resized PIP 1720 is touched again by the user while being displayed, it may be returned to the PIP 1720 of the prior size.

The user may identify the detailed settings through the resized PIP and, if the website shortcut is selected, a website screen 1730 may be displayed as shown in FIG. 17(*c*). Further, although the website shortcut is not selected by the user, the electronic device 300 may automatically display the screen of the website according to the timing for automatic execution when the shortcut is not executed or the alarm time.

For example, if the user sets the PIP for ticketing to 10 minutes before, the PIP 1710 may be displayed 15 minutes before the alarm time as shown in FIG. 17(*a*). If the website is not accessed by the user until the predetermined time elapses, the electronic device 300 may display an additional PIP 1720 with a shortcut link to lead to the user's selection as shown in FIG. 17(*b*). In this case, if the website is not accessed until the ticketing alarm time is imminent, e.g., until before one minute, the user may be led to make a selection by changing at least one of the color effect, color, or saturation of the PIP 1720 and displaying it. Accordingly, the website may automatically be executed by the user's direct selection of the website link or at the set timing for automatic execution.

Figure 18:
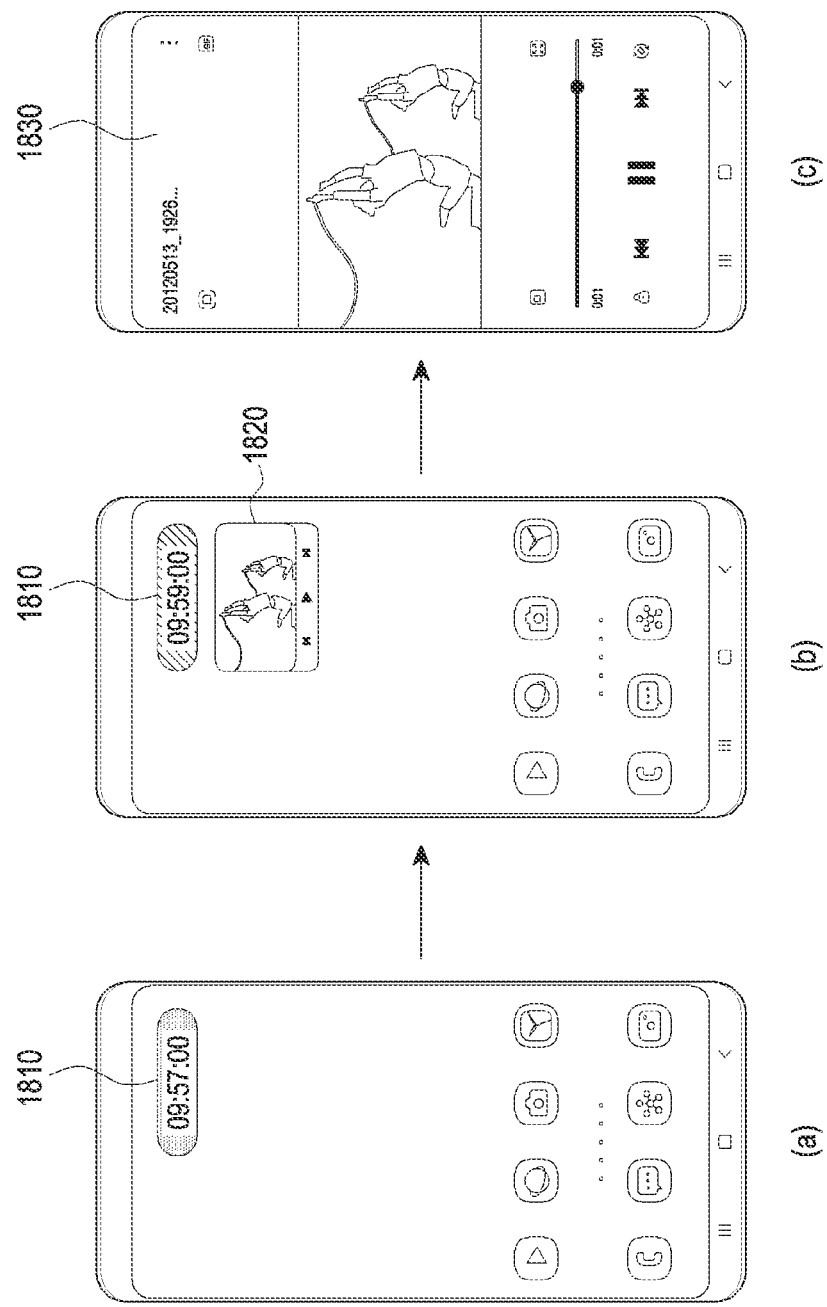
FIG. 18 illustrates a video playback screen using an execution window when an alarm time arrives according to an embodiment.

FIG. 18 illustrates a video playback screen using an execution window when an alarm time arrives according to an embodiment. FIG. 18 is an example which shows that the shape of a PIP is changed when an alarm time arrives in relation to content subscribed to or reserved by the user.

Referring to FIG. 18(*a*), if at least one condition for PIP display related to an alarm function is met, e.g., if the timing for PIP display related to the alarm function set by the user arrives, the electronic device 300 may display a PIP 1810 including the remaining time in relation to the set alarm function. The user may set the type of the application to be executed at the alarm time. For example, if the user makes a setting to play content through the video playback application, the electronic device 300 may display a PIP 1820 including a preview for content playable through the video playback application, along with the PIP 1810 including the remaining time as shown in FIG. 18(b). In this case, if the PIP 1820 including the preview is touched, a detailed description of the content may be displayed.

Upon receiving an additional user input (e.g., selection of the play button) for playing the content while displaying the PIP 1820 including the preview, the electronic device 300 may execute the video playback application and may immediately play the content that used to be provided in preview, through the video playback application.

When the alarm time arrives, the electronic device 300 may control the video playback application to run in the foreground state. Accordingly, it is possible to display a screen where content is played through the video playback application as shown in FIG. 18(c). The electronic device 300 may obtain real-time content playback-related data from the server 205 based on the user settings related to the reservation pre-stored, when obtaining the real-time content playback-related data associated with the video playback application.

Figure 19:
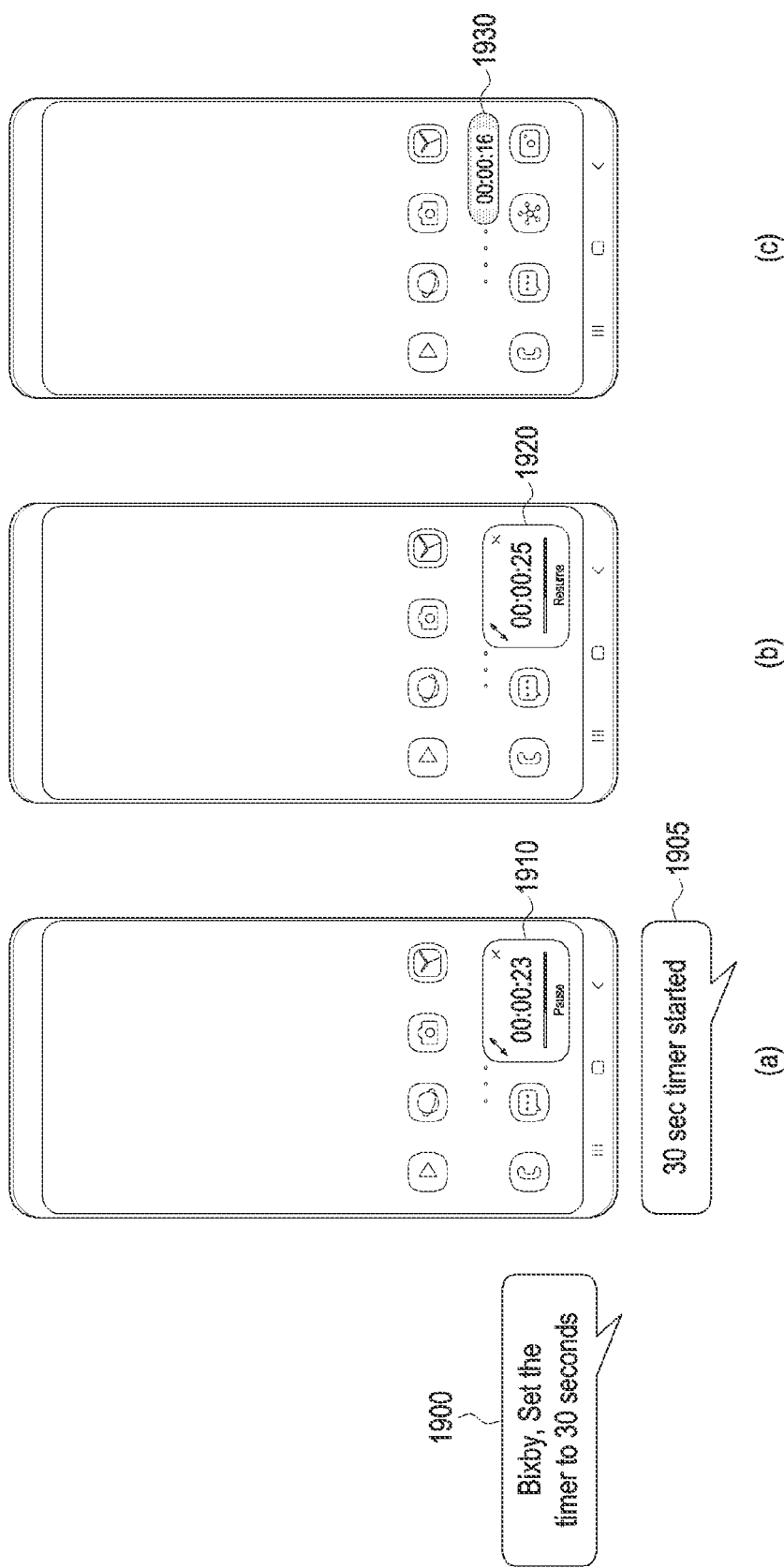
FIG. 19 illustrates an example of displaying an execution window of a timer application using an intelligent function according to an embodiment.

FIG. 19 illustrates an example of displaying an execution window of a timer application using an intelligent function according to an embodiment.

FIG. 19 illustrates an example in which the electronic device 300 receives user inputs and executes an intelligent function (e.g., an intelligent application or a speech recognition application) interworking with an intelligent agent. The electronic device 300 may execute the intelligent application for recognizing a speech through a microphone or a specific key. For example, if a speech command (e.g., "Bixby! Set the timer to 30 seconds") is input at 1900 through the microphone, the electronic device 300 may execute the intelligent application on the display 360 and may execute the timer function without disturbing a running task.

As shown in FIG. 19(a), an answer (e.g., NLG, natural language understanding) (e.g., "30 seconds timer started") at 1905 to the speech command may be output, and a PIP 1910 related to the timer application corresponding to the speech command may be displayed on the display 360. Further, in response to a user input (e.g., pause or resume) to the PIP 1910 related to the timer application, a PIP 1920 in which the control button has been changed may be displayed, as shown in FIG. 19(b), and if a predetermined time elapses without a user input, a PIP 1930 of the minimum size including the remaining time may be displayed, as shown in FIG. 19(c). In this case, the PIP 1910 corresponding to the speech command is not displayed on the UI (e.g., conversation view) of the intelligent application, but may be overlaid and displayed on the execution screen of another application. Therefore, the user may identify the state of the timer without disturbing the running task, i.e., even while using another application, although the timer application is executed using the intelligent function.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave).

A method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, there may be provided a non-transitory computer readable storage medium storing instructions configured to, when executed by at least one processor of an electronic device, enable the electronic device to perform at least one operation. The at least one operation may comprise displaying an execution window corresponding to an application on a display of the electronic device when the application is executed, displaying the execution window, as a first shape of execution window, on at least a portion of the display, in response to a background switch request for the application, identifying a state of the application while displaying the first shape of execution window, and switching the first shape of execution window into a second shape of execution window according to the state of the application.

According to various embodiments, it is possible to allow the user to effectively check, at a glance, the application being currently used and the application running in the background even without executing the previously used application back in the foreground.

According to various embodiments, it is possible to allow the user to easily check the current operation state even without checking the status bar or selecting the application by effectively displaying an execution screen for the application running in the background.

According to various embodiments, it is possible to allow the user to easily check and control the remaining time without disturbance to viewing video although a video playback application is executed with a timer application running in the background.

While the present disclosure has been described with reference to certain embodiments, various changes may be made without departing from the spirit and the scope of the disclosure, which is defined, not by the detailed description and embodiments, but by the appended claims and their equivalents.

What is claimed is:

1. An electronic device comprising:
a display;
at least one processor operatively connected with the display; and
memory storing instructions configured to, when executed, enable the electronic device to:
based on an application being executed, display an execution window corresponding to the application on the display,
display the execution window, as a first shape of execution window, on at least a portion of the display, in response to a background switch request for the application,
identify a state of the application while displaying the first shape of execution window,
identify whether a designated wait time elapses while executing the application in a background, and
switch the first shape of execution window into a second shape of execution window according to the state of the application, in response to the elapse of the designated wait time,
wherein the first shape of execution window includes at least part of content and functions for controlling the application and the second shape of execution window includes fewer components than the first shape of execution window.

2. The electronic device of claim 1, wherein the instructions are configured to enable the electronic device to:
switch into the second shape of execution window by changing at least one of a size and placement position of the first shape of execution window,
wherein a size of the second shape of execution window is smaller than the size of the first shape of execution window.

3. The electronic device of claim 2, wherein the instructions are configured to enable the electronic device to, based on at least one other application running in a foreground, switch into the second shape of execution window by changing at least one of the size and placement position of the first shape of execution window so as to not overlap an execution window corresponding to each of the at least one other application.

4. The electronic device of claim 1, wherein the instructions are configured to enable the electronic device to:
identify a user input to the first shape of execution window while displaying the first shape of execution window, and
pause or resume the application in response to the user input.

5. The electronic device of claim 4, wherein the instructions are configured to enable the electronic device to switch the first shape of execution window into the second shape of execution window in response to an additional user input to the first shape of execution window or an elapse of a designated wait time after pausing the application.

6. The electronic device of claim 1, wherein the instructions are configured to enable the electronic device to:
when the application is a timer application, drive a timer function of the timer application with a set timer time,
identify a remaining time of the timer function while displaying the first shape of execution window including a progress of the timer function, and
switch the first shape of execution window into the second shape of execution window in response to the identified remaining time.

7. The electronic device of claim 6, wherein the instructions are configured to enable the electronic device to change at least one of a color effect, color, or saturation of the second shape of execution window in association with the remaining time of the timer function.

8. The electronic device of claim 6, wherein the instructions are configured to enable the electronic device to, in response to the set timer time being elapsed, display the second shape of execution window including an excess time of the timer function.

9. The electronic device of claim 6, wherein the instructions are configured to enable the electronic device to:

identify a user input to the first shape of execution window while displaying the first shape of execution window including the progress of the timer function, and when the user input is a touch and drag input, move and display the first shape of execution window in a direction corresponding to the touch and drag input.

10. The electronic device of claim 9, wherein the instructions are configured to enable the electronic device to, when the first shape of execution window at least partially departs from the display in response to the touch and drag input, switch the first shape of execution window into a third shape of execution window in response to the identified remaining time.

11. A method for displaying an execution screen of an application by an electronic device, the method comprising:
displaying an execution window corresponding to the application on a display based on the application being executed;
displaying the execution window, as a first shape of execution window, on at least a portion of the display, in response to a background switch request for the application;
identifying a state of the application while displaying the first shape of execution window;
identifying whether a designated wait time elapses while executing the application in a background; and
switching the first shape of execution window into a second shape of execution window according to the state of the application, in response to the elapse of the designated wait time,
wherein the first shape of execution window includes at least part of content and functions for controlling the application and the second shape of execution window includes fewer components than the first shape of execution window.

12. The method of claim 11, wherein switching the first shape of execution window into the second shape of execution window includes:
switching into the second shape of execution window by changing at least one of a size and placement position of the first shape of execution window,
wherein a size of the second shape of execution window is smaller than the size of the first shape of execution window.

13. The method of claim 12, wherein switching the first shape of execution window into the second shape of execution window includes:
based on at least one other application running in a foreground, switching into the second shape of execution window by changing at least one of the size and placement position of the first shape of execution window so as to not overlap an execution window corresponding to each of the at least one other application.

14. The method of claim 11, further comprising:
identifying a user input to the first shape of execution window while displaying the first shape of execution window; and pausing or resuming the application in response to the user input.

15. The method of claim 11, wherein switching the first shape of execution window into the second shape of execution window includes:
when the application is a timer application, driving a timer function of the timer application with a set timer time;
identifying a remaining time of the timer function while displaying the first shape of execution window including a progress of the timer function; and
switching the first shape of execution window into the second shape of execution window in response to the identified remaining time.

16. The method of claim 15, wherein switching the first shape of execution window into the second shape of execution window in response to the identified remaining time includes
changing at least one of a color effect, color, or saturation of the second shape of execution window in association with the remaining time of the timer function.

17. The method of claim 15, further comprising:
identifying a user input to the first shape of execution window while displaying the first shape of execution window including the progress of the timer function; and
when the user input is a touch and drag input, moving and displaying the first shape of execution window in a direction corresponding to the touch and drag input; and
when the first shape of execution window at least partially departs from the display in response to the touch and drag input, switching the first shape of execution window into a third shape of execution window in response to the identified remaining time.

18. A non-transitory computer readable storage medium storing instructions, the instructions configured to, when executed by at least one processor of an electronic device, enable the electronic device to perform at least one operation, the at least one operation comprising:
displaying an execution window corresponding to an application on a display of the electronic device based on the application being executed;
displaying the execution window, as a first shape of execution window, on at least a portion of the display, in response to a background switch request for the application;
identifying a state of the application while displaying the first shape of execution window;
identifying whether a designated wait time elapses while executing the application in a background; and
switching the first shape of execution window into a second shape of execution window according to the state of the application, in response to the elapse of the designated wait time,
wherein the first shape of execution window includes at least part of content and functions for controlling the application and the second shape of execution window includes fewer components than the first shape of execution window.

* * * * *